(12) United States Patent
Takahashi et al.

(10) Patent No.: US 6,560,036 B2
(45) Date of Patent: May 6, 2003

(54) REAL IMAGE TYPE VIEW FINDER

(75) Inventors: Toshio Takahashi, Hachioji (JP); Akiyoshi Tochigi, Hachioji (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/860,477

(22) Filed: May 21, 2001

(65) Prior Publication Data

US 2002/0001136 A1 Jan. 3, 2002

(30) Foreign Application Priority Data

May 22, 2000 (JP) ........................... 2000-149660

(51) Int. Cl.⁷ ............................................. G02B 13/08
(52) U.S. Cl. ................... 359/688; 359/658; 359/659; 359/678; 359/683
(58) Field of Search .................. 359/688, 658, 359/659, 678, 682, 683; 396/382, 384, 379

(56) References Cited

U.S. PATENT DOCUMENTS 5,225,927 A  * 7/1993 Nozaki et al. .............. 359/355
5,627,618 A  * 5/1997 Kasai et al. ................. 396/379

FOREIGN PATENT DOCUMENTS

| JP | 05-093863 | 4/1993 |
| JP | 06-051201 | 2/1994 |
| JP | 06-300971 | 10/1994 |
| JP | 07-13076 | 1/1995 |
| JP | 11-242167 | 9/1999 |
| JP | 2000039649 | 2/2000 |

* cited by examiner

*Primary Examiner*—Hung Xuan Dang
*Assistant Examiner*—Tuyen Tra
(74) *Attorney, Agent, or Firm*—Pillsbury Winthrop LLP

(57) ABSTRACT

A real image type view finder comprising an objective optical system which has positive refractive power and forms an intermediate image, an image erecting optical system which erects the intermediate image and an eyepiece optical system which leads the intermediate image to an observer's eye, in which the objective optical system comprises a first positive lens unit, a second negative lens unit, a third negative lens unit and a fourth positive lens unit, moves the second lens unit and the third lens unit for a magnification change, has a vari-focal ratio on the order of 4, and has favorable optical performance over an entire zooming region.

33 Claims, 16 Drawing Sheets

SPHERICAL
ABERRATION

ASTIGMATISM

DISTORTION

SPHERICAL
ABERRATION

ASTIGMATISM

DISTORTION

SPHERICAL ABERRATION

ASTIGMATISM

DISTORTION

REAL IMAGE TYPE VIEW FINDER

BACKGROUND OF THE INVENTION a) Field of the Invention

The present invention relates to a real image type view finder.

b) Description of the Prior Art

As conventional examples of real image view finder which is compact and has a high vari-focal ratio, there are known view finders each of which consist, in order from the object side, of a first lens unit having positive refractive power, a second lens unit having negative refractive power, a third lens unit having negative refractive power and a fourth lens unit having positive refractive power, and is configured to change a magnification by moving the second lens unit and the third lens unit along an optical axis, like view finders disclosed, for example, by Japanese Patents Kokai Publication No. Hei 6-300971, No. Hei 7-13076 and No. Hei 5-93863.

These conventional real image type view finders uses objective optical systems having short back focal lengths and eyepiece optical systems using short prisms, thereby being low in prism composition freedom.

Out of the above described conventional examples, view finders according to first through third embodiments of the Japanese Patent Kokai Publication No. Hei 7-13076 have low vari-focal ratios, and view finders according to fourth and fifth embodiments of this patent have high vari-focal ratios but produce remarkable longitudinal chromatic aberration at tele positions, whereby it cannot be said that these view finders have sufficiently favorable optical performance.

Furthermore, the conventional example of view finder disclosed by Japanese Patent Kokai Publication No. Hei 6-300971 uses the second lens unit which consists of two lens elements, thereby having a defect of relatively high cost Furthermore, the conventional view finder disclosed by Japanese patent Kokai Publication No. Hei 5 -93863 also has a low vari-focal ratio.

Furthermore, a conventional example disclosed by Japanese Patent Kokai Publication No. 2000-39649 is a real image type view finder which has a composition shown in FIG. 1 and is suited to configure a camera compact. This real image type view finder used an objective optical system which consists of positive, negative, negative and positive lens elements, but the Publication makes no disclosure of a composition which satisfies conditions for both favorable optical performance, and a compact and thin configuration.

SUMMARY OF THE INVENTION

An object of the present invention is to provide a real image type view finder comprising an objective optical system which has positive refractive power and forms an intermediate image, an image erecting optical system which comprises at least a prism and erects the intermediate image, and an eyepiece optical system which leads the intermediate image to an observer's eye, wherein the objective optical system comprises, in order from the object side, a first lens unit having positive refractive power, a second lens unit having negative refractive power, a third lens unit having negative refractive power and a fourth lens unit having positive refractive power, changes a magnification by moving the second lens unit and the third lens unit, and satisfies the following condition (1):

$$0.97 < Lr/S < 1.2 \tag{1}$$

A second object of the present invention is to provide a real image type view finder comprising an objective optical system which has positive refractive power and forms an intermediate image, an image erecting optical system which comprises at least a prism and erects the intermediate image, and an eyepiece optical system which leads the intermediate image to an observer's eye, wherein the view finder comprises an optical member disposed in the vicinity of the intermediate image separately from the prism and is configured to allow the optical member to be exchanged independently.

A third object of the present invention is to provide a real image type view finder comprising an objective optical system which has positive refractive power and forms an intermediate image, an image erecting optical system which comprises at least a prism and erects the intermediate image, and an eyepiece optical system which leads the intermediate image to an observer's eye, wherein the objective optical system comprises, in order from the object side, a first lens unit having positive refractive power, a second lens unit having negative refractive power, a third lens unit having negative refractive power and a fourth lens unit having positive refractive power, changes a magnification by moving the second lens unit and the third lens unit in an identical direction along an optical axis, and satisfies the following condition (2):

$$-0.4 < f_4(f_3 \times z) < -0.185 \tag{2}$$

A fourth object of the present invention is to provide a real image type view finder comprising an objective optical system which has positive refractive power and form an intermediate image, an image erecting optical system which comprises at least a prism and erects the intermediate image, and an eyepiece optical system which leads the intermediate image to an observer's eye, wherein the objective optical system comprises, in order from the object side, a first lens unit having positive refractive power, a second lens unit having negative refractive power, a third lens unit having negative refractive power and a fourth lens unit having positive refractive power, changes a magnification by moving the second lens unit and the third lens unit in an identical direction, and satisfies the following condition (6):

$$1.1 < (f_1 \times f_2)/(f_3 \times f_4) < 1.6 \tag{6}$$

A fifth object of the present invention is to provide a real image type view finder comprising an objective optical system which has positive refractive power and forms an intermediate image, an image erecting optical system which erects the intermediate image, and an eyepiece optical system which leads the intermediate image to an observer's eye, changes a magnification by moving the second lens unit and the third lens unit, and satisfies the following condition (9):

$$0.8 < (L3-L2) \times 2/L2 < 5.5 \tag{9}$$

A sixth object of the present invention is to provide a real image type view finder comprising an objective optical system which is configured separately from a photographic optical system and forms an intermediate image, a visual field frame disposed in the vicinity of the intermediate image, and an image erecting optical system which erects the intermediate image, wherein the objective optical system comprises, in order from the object side, a first lens unit having positive refractive power, a second lens unit having negative refractive power, a third lens unit having negative refractive power and a fourth lens unit having positive refractive power, a focal length of the objective optical system can be shorter than that of an eyepiece optical system, and the view finder satisfies the following condition (7):

$$0.53 < H(\max)/fe < 1 \qquad (7)$$

DETAILED DESCRIPTION OF THE PREFERRED EMBODIMENTS

Figure 1:
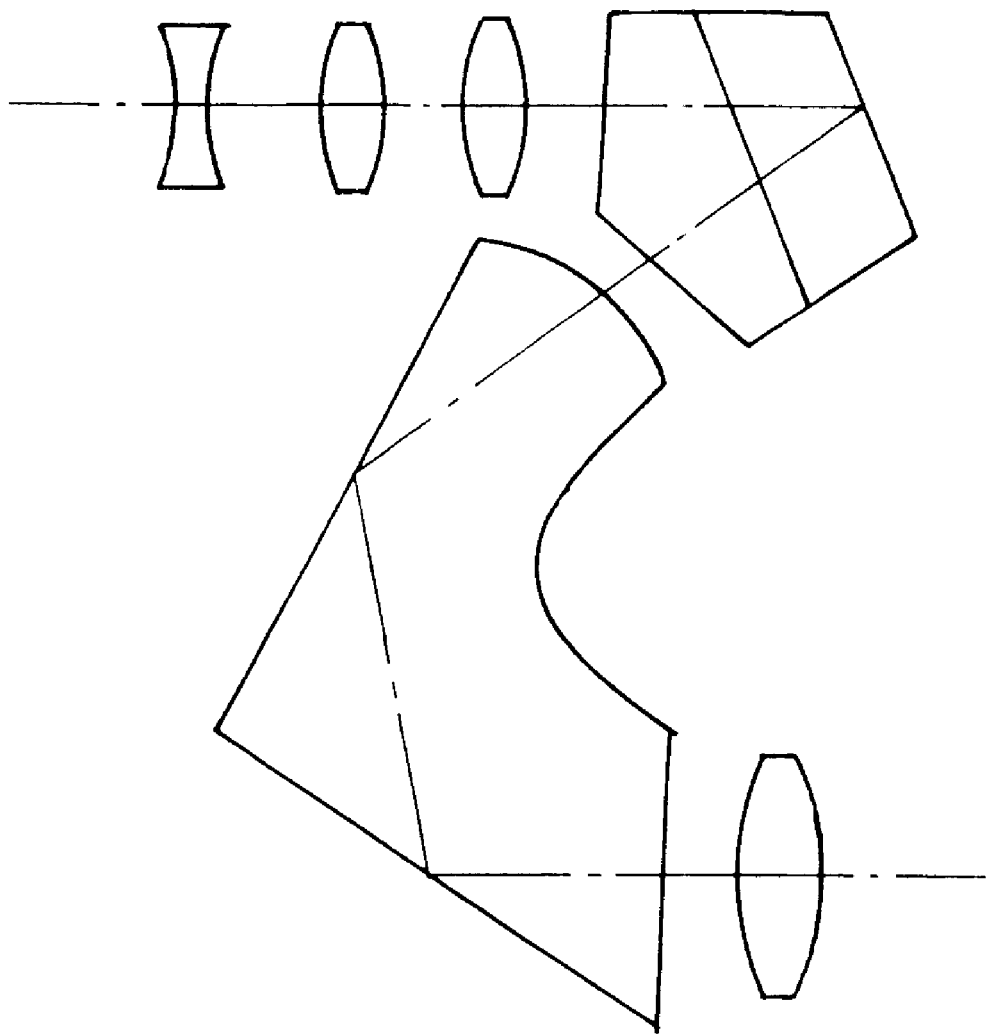
FIG. 1 is a sectional view showing a composition of a conventional real image type view finder.

A real image type view finder having a first composition according the present invention is characterized in that the view finder comprises an objective optical system which forms an intermediate image and has positive refractive power, an image erecting optical system which comprises at least a prism and erects the intermediate image, and an eyepiece optical system which leads the intermediate image to an observer's eye, and that the objective optical system comprises, in order from the object side, a first lens unit having positive refractive power, second lens unit having negative refractive power, a third lens unit having negative refractive power and a fourth lens unit having positive refractive power, changes a magnification by moving the second lens unit and the third lens unit along an optical axis, and satisfies the following condition (1):

$$0.97 < Lr/S < 1.2 \qquad (1)$$

wherein a reference symbol Lr represents an optical path length as measured from the intermediate image formed by the objective optical system to an object side surface of the eyepiece optical system and a reference symbol S designates a distance as measured from an object side curved surface to a pupil side curved surface of the objective optical system.

In order to obtain a view finder which has a vari-focal ratio of 3.5 or higher and favorable optical performance as one of the objects of the present invention, it is preferable to compose an objective optical system, in order from the object side, of a first lens unit having positive refractive power, a second lens unit having negative refractive power, a third lens unit having negative refractive power and a fourth lens unit having positive refractive power, and change a magnification by moving the second lens unit and the third lens unit along an optical axis as described above. When an objective optical system is composed as described above, a burden for correcting aberrations is shared uniformly among the lens units, whereby aberrations can be corrected favorably in the optical system. A symmetrical positive-negative negative-positive power distribution is effective for favorable correction of distortion and coma in particular.

For a reason described above, the above described composition makes it possible to obtain an optical system which has a high vari-focal ratio and high optical performance.

Furthermore, it is possible to obtain a view finder having high freedom at a high degree at a stage to compose the image erecting optical system by satisfying the condition (1) as described above.

If a lower limit of 0.97 of the condition (1) is exceeded, it will be difficult to use a pentagonal prism as the image erecting optical system. That is, it will be impossible to reserve a sufficient distance between an intermediate image surface and the eyepiece optical system, whereby no space cannot be obtained for disposing an image erecting prism or the objective optical system will have a long total length, whereby a camera itself will undesirably be enlarged when a space for disposing an image erecting prism or the like is reserved between the objective optical system and the intermediate image. When the objective optical system is configured so that an upper limit of the condition (1) is not exceeded, it is possible to dispose a prism such as that disclosed by Japanese Patent Kokai Publication No. 2000-89649 in an optical system which is composed of positive, negative, negative and positive lens units like the objective optical system according to the present invention while maintaining favorable optical performance of the optical system. When the objective optical system is configured so that an upper limit of the condition (1) is not exceeded, it is possible to dispose a prism such as that disclosed by Japanese Patent Kokai Publication No. 2000-89649 in an optical system which is composed of positive, negative, negative and positive lens units like the objective optical system according to the present invention while maintaining favorable optical performance of the optical system.

If the upper limit of 1.2 of the condition (1) is exceeded, it will be impossible to configure the eyepiece optical system so as to have favorable optical performance while maintaining a compact design. That is, the eyepiece optical system will have a long focal length whereby a space required for erecting the image must be reserved by folding an optical path and a camera will be enlarged. In a case where the upper limit of the condition (1) is exceeded in a condition where the eyepiece optical system has a short focal length, a front principal point of the eyepiece optical system will be located on the object side of the optical system, thereby making it difficult to maintain optical performance of the eyepiece optical system. In a condition where the upper limit of the condition (1) is exceeded, it will be impossible to reserve a moving space for a magnification change which is sufficient for obtaining a high vari-focal ratio and high optical performance.

A real image type view finder having a second composition according to the present invention is characterized in that the view finder comprises an objective optical system which forms an intermediate image and has positive refractive power, an image erecting optical system which comprises at least a prism and erects the above described intermediate image, and an eyepiece optical system which leads the above described intermediate image to an observer's eye, uses an optical which is disposed in the vicinity of the above described intermediate image separately from the prism, and allows the above described optical member to be exchanged independently.

It is not preferable to configure the view finder which has the above described composition so as to locate the intermediate image surface on a surface of the prism since such an intermediate image surface allows an image of slight dust or injury, if any, on the prism surface to be formed on an image to be observed. Though the prism may be exchanged in such a case, exchange and discard of the prism poses a problem of cost since the prism is larger than other optical members, has a large number of surfaces and is expensive.

The view finder having the above described second composition according to the present invention uses the optical member which is disposed in the vicinity of the intermediate image formed by the objective optical system, whereby the dust or the like adhering to the prism surface which has a large diopter deviation is not remarkable in observation. Furthermore, the view finder having the second composition is advantageous from a viewpoint of cost since the view finder uses only the above described optical member which is simple and inexpensive as a part to be exchanged when defective.

A planar plate or the like is used as the above described optical member.

When the objective optical system is composed, in order from the object side, of a first positive lens unit, a second negative lens unit, a third negative lens unit and a fourth positive lens unit, the rear image type view finder having the second composition can be configured as a view finder which is compact and has high optical performance.

A view finder having a third composition according to the present invention is characterized in that the view finder comprises an objective optical system which forms an intermediate image and has positive refractive power, an image erecting optical system which comprises a prism for erecting the intermediate image formed by the objective optical system, and an eyepiece optical system which leads the intermediate image to an observer's eye, and that the objective optical system comprises, in order from the object side, a first positive lens unit, a second negative lens unit, a third negative lens unit and a fourth positive lens unit, changes a magnification by moving the second lens unit and the third lens unit in an identical direction along an optical axis and satisfies the following condition (2)

$$-0.4 < f_4/(f_3 \times z) < -0.185 \quad (2)$$

wherein reference symbols $f_3$ and $f_4$ represent focal lengths of the third lens unit and the fourth lens unit respectively, and a reference symbol z designates a zoom ratio.

In order to configure an objective optical system to be used in a view finder so as to have a high vari-focal ratio and high optical performance, it is effective to select a positive negative-negative-positive power distribution for the objective optical system as described with reference to the view finder which has the first composition. When an image erecting optical system is to be disposed in the view finder, it is effective for enhancing freedom in disposition of the image erecting optical system to prolong a back focal length of the objective optical system.

The above-mentioned condition (2) is required for prolonging a back focal length and obtaining adequate optical performance. The third lens unit and the fourth lens unit of the objective optical system of the view finder according to the present invention which have the negative refractive power and the positive refractive power compose a lens system which is nearly a retrofocus type. If the third lens unit and the fourth lens unit exceed an upper limit of −0.185 of the condition (2), the third lens unit will have too strong power, thereby making it difficult to maintain required optical performance. Specifically, it will be difficult to correct coma at marginal portions and an objective optical system having high optical performance cannot be obtained even when an aspherical surface is used.

If the third lens unit has power strong enough to exceed the upper limit of the condition (2) with a movable region of the objective optical system for zooming preliminarily set at a predetermined value, the view finder will be under large adverse influences due to eccentricity and the like at a manufacturing stage.

If a lower limit of −0.4 of the condition (2) is exceeded, the third lens unit will have too weak power, thereby making it impossible to obtain a sufficient back focal length, for example, at a tele position.

For the real image type view finder having the third composition according to the present invention, it is desirable that the objective optical system satisfies the following condition (3):

$$0.4 < |f_2|/fE < 0.55 \quad (3)$$

wherein a reference symbol $f_2$ represents a focal length of the second lens unit and a reference symbol fE designates a focal length of the eyepiece optical system.

The condition (3) is required for maintaining favorable chromatic aberration in an entire magnification changing region from a wide position to the tele position.

If an upper limit of 0.55 of the condition (3) is exceeded, lateral chromatic aberration will be aggravated or if a lower limit of 0.4 of the condition (3) is exceeded, longitudinal chromatic aberration will be aggravated. In other words, it will be impossible to balance lateral chromatic aberration with longitudinal chromatic aberration if the condition (3) is not satisfied.

For the real image type view finder having the third composition according to the present invention, it is desirable that each of the first lens unit through the fourth lens unit of the objective optical system is composed of a lens element, and that the objective optical system satisfies the following conditions (4) and (5):

$$20 < v_d(2) < 40 \quad (4)$$

$$45 < v_d(3) < 65 \quad (5)$$

wherein reference symbols $v_d(2)$ and $v_d(3)$ represent Abbe's number of the second lens unit and the third lens unit respectively.

These conditions (4) and (5) are required also for maintaining favorable chromatic aberration. If an upper limit of the condition (4) or (5) is exceeded, lateral chromatic aberration will be favorable but longitudinal chromatic aberration will be aggravated on a side of the tele position. If a lower limit of the condition (4) or (5) is exceeded, in contrast, longitudinal chromatic aberration will be favorable but lateral chromatic aberration will be aggravated, thereby making it impossible to maintain favorable optical performance.

A real image type view finder which has a fourth composition according to the present invention is characterized in that the view finder comprises an objective optical system which forms an intermediate image and has positive refractive power, an image erecting optical system which comprises at least a prism and erects the intermediate image formed by the objective optical system, and an eyepiece optical system which leads the intermediate image formed by the objective optical system to an observer's eye, and that the objective optical system comprises, in order from the object side, a first positive lens unit, a second negative lens unit, a third negative lens unit and a fourth positive lens unit, changes a magnification by moving the second lens unit and the third lens unit in an identical direction along an optical axis, and satisfies the following condition (6):

$$1.1 < (f_1 \times f_2)/(f_3 \times f_4) < 1.6 \qquad (6)$$

wherein reference symbols $f_1$, $f_2$, $f_3$ and $f_4$ represent focal lengths of the first lens unit, the second lens unit, the third lens unit and the fourth lens unit respectively.

In order to configure an objective optical system to be used in the view finder according to the present invention so as to have a high vari-focal ratio and high optical performance, it is effective to select the positive-negative-negative-positive power distribution for the objective optical system as described above.

In order to configure the objective optical system of the view finder which has the above described composition so as to have higher optical performance while maintaining a predetermined size and a high vari-focal ratio, it is preferable to define power of each lens unit so as to satisfy the condition(6).

If an upper limit of 1.6 of the condition (6) is exceeded, the first lens unit and the second lens unit will have long focal lengths, whereby the first lens unit and the second lens unit will have weak power and large outside diameters. For the optical system which has the above described power distribution among the first lens unit through the fourth lens unit in particular, a focal length of the first lens unit or the second lens unit which exceeds the upper limit of the condition (6) is not preferable since such a focal length inevitably obliges to enlarge an outside diameter of the first lens unit at the wide position, thereby undesirably imposing a severe restriction on a layout of the view finder.

If a lower limit of L1 of the condition (6) is exceeded, in contrast, the first lens unit and the second lens unit will have short focal lengths and too strong power, thereby making it difficult to correct aberrations.

For the real image type view finder which has one of the above described first through fourth compositions and a fifth composition described later, it is desirable to use as the image erecting optical system which erects the intermediate image an optical system which is configured so as to have a roof reflecting surface and two reflecting surfaces, reflect rays incident on an edge line of the roof reflecting surface at an acute angle and reflect the reflected rays at obtuse angles on the two reflection surfaces.

Furthermore, it is preferable to configure the roof reflecting surface and the two reflecting surfaces as internal reflecting surfaces which totally reflect the rays, thereby preventing a light quantity from being reduced due to absorption and the like.

Furthermore, the real image type view finder which has one of the above described first through fourth compositions and the fifth composition described later allows the objective optical system to have a long back focal length and makes it possible to reserve a long distance as measured from the intermediate image to the eyepiece optical system. Accordingly, the real image type view finder enhances design freedom of the image erecting optical system and makes it possible to dispose a prism optical system for image erection which is used in the conventional example shown in FIG. 1.

Accordingly, the real image type view finder therefore allows four totally reflecting surfaces to be disposed and makes it unnecessary to use a reflecting coat, whereby the real image type view finder can be configured as a bright view finder at a low cost.

For the real image type view finder which has one of the first through fifth compositions according to the present invention, it is preferable to configure, as a spherical surface or an aspherical surface, a surface of incidence of a first prism which is closest to the intermediate image out of prisms to be used in the image erecting optical system for erecting the intermediate image.

In other words, the view finder according to the present invention has a composition which is equivalent to a composition where a fifth lens unit is disposed after a fourth lens unit when the surface of the prism which is closest to the objective optical system (a surface closest to the fourth lens unit of the objective optical system) is configured as the refracting surface (a spherical surface or an aspherical surface).

In order to enhance a vari-focal ratio for changing a magnification from a wide position to a tele position of the view finder according to the present invention, it is necessary to strengthen power of each lens unit of the objective optical system, thereby producing aberrations in large amounts by each lens unit.

It is preferable to configure the surface of the prism closest to the fourth lens unit as a refracting surface (a spherical surface or an aspherical surface) since such a refracting surface shares an aberration correcting function to the fourth lens unit, thereby making it possible to maintain favorable optical performance of the objective optical system even when this optical system has a high vari-focal ratio.

For the real image type view finder which has one of the first through fifth compositions, it is desirable to configured the view finder so as to be capable of performing a diopter adjustment at a stage of specification change by changing locations of the first, second, third and fourth lens unit of the objective optical system all together.

A lot of cameras nowadays use liquid crystal displays (LCDs) for displaying information in visual fields for panoramic photographing and the like. Such a camera has merits that the camera is simpler in a mechanism than a camera which uses a mechanical panoramic visual field frame, for example, and that the camera can display other information.

It is advantageous from a viewpoint of cost to use an identical view finder commonly to such a camera which uses an LCD (first specification) and an inexpensive camera which has no function of a panoramic display (second specification). When a view finder for a camera which uses an LCD and a view finder for a camera which does not use the LCD are composed of an identical view finder unit, however, optical path lengths are different between the cameras by a distance corresponding to a thickness of the LCD, thereby causing a diopter deviation.

As a method to correct this diopter deviation, there are available a method which moves a location of a visual field mask and a method which changes locations of lens elements in an objective optical system.

When an objective optical system consists of four positive, negative, negative and positive lens units like that of the real image type view finder according to the present invention, diopter varies nearly at a constant rate between a third lens unit and a fourth lens unit, and between the fourth lens unit and a first prism in a vari-focal region from a wide position to a tele position. It is therefore possible to perform a diopter adjustment between the above described two specifications (the first and second specifications) by uniformly changing an airspace between the third lens unit and the fourth lens unit or an airspace between the fourth lens unit and the first prism from the wide position to the tele position.

When the airspace between the fourth lens unit and the first prism is to be used for the diopter adjustment out of the two airspaces, it is necessary to move all the first lens unit through fourth lens units, thereby complicating a mechanism for the diopter adjustment.

When the first through third lens units are to be moved collectively for the diopter adjustment as described above, the adjustment can be performed with a simple mechanism.

For the real image type view finder which has one of the first through fifth compositions according to the present invention, it is desirable to configure the view finder so as to be capable of adjusting a diopter deviation by changing a location of only the second lens unit or locations of the second lens unit and the third lens unit collectively at a stage to assemble the objective optical system in the view finder.

In an objective optical system which consists of positive, negative, negative and positive lens units like that of the real image type view finder according to the present invention, diopter is changed most remarkably in an airspace between the first lens unit and the second lens unit when airspaces are changed in the vicinity of a tele position. In order to obtain an adequate airspace between the first lens unit and the second lens unit, it is preferable to configure the objective optical system so as to permit adjusting a location of only the second lens unit or locations of the second lens unit and the third lens unit collectively. The diopter deviation of the view finder at the tele position can be easily adjusted at the assembling stage when the objective optical system is configured so as to permit adjusting the location only of the second lens unit or the locations of the second lens unit and the third lens unit collectively in the direction along the optical axis. Since diopter of a view finder which has a composition like that according to the present invention is scarcely changed on a side of a wide position by moving a second lens unit and a third lens unit in a direction along an optical axis, it is possible reduce a diopter variation from the wide position to a tele position by adjusting a diopter deviation on a side of the tele position as described above.

A real image type view finder which has the fifth composition according to the present invention is characterized in that the view finder comprises an objective optical system which forms an intermediate image, an image erecting optical system which erects the intermediate image formed by the objective optical system and an eyepiece optical system which leads the intermediate image formed by the objective optical system to an observer's eye, and that the objective optical system comprises, in order from the object side, a first positive lens unit, a second negative lens unit, a third negative lens unit and a fourth positive lens unit, changes a magnification by moving the second lens unit and the third lens unit, and satisfies the following condition (9):

$$0.8<(L3-L2)\times z/L2<5.5 \qquad (9)$$

wherein reference symbols L2 and L3 represent moving distance of the second lens and the third lens unit respectively for changing a magnification from a wide position to a tele position.

In order to configure the objective optical system of the real image type view finder according to the present invention so as to have a high vari-focal ratio and high optical performance, it is preferable to configure the objective optical system so as to comprise a first positive lens unit, a second negative lens unit, a third negative lens unit and a fourth positive lens unit, and move the second lens unit and the third lens unit as described above. In this case, the objective optical system can have a high vari-focal ratio and favorable optical performance on a side of a tele position in particular when the objective optical system is configured to satisfy the condition (9).

If an upper limit of 5.5 of the condition (9) is exceeded, the third lens unit will be moved for a short distance, thereby making it impossible to change a magnification sufficiently on the side of the tele position. If a lower limit of 0.8 of the condition (9) is exceeded, in contrast, the second lens unit will have too strong lower, thereby making it difficult to maintain high optical performance over an entire region from the wide position to the tele position. It will be difficult to balance longitudinal chromatic aberration on the side of the tele position with lateral chromatic aberration on a side of the wide position in particular.

A real image type view finder which has a sixth composition according to the present invention is characterized in that an image pickup optical system and a view finder optical system are composed separately, that the view finder optical system comprises an objective optical system which forms an intermediate image and has positive refractive power, a visual field frame which is disposed in the vicinity of the intermediate image formed by the objective optical system and an eyepiece optical system which leads the intermediate image formed by the objective optical system to an observer's eye, that the objective optical system comprises, in order from the object side, a first lens unit having positive refractive power, a second lens unit having negative refractive power, a third lens unit having negative refractive power and a fourth lens unit having positive refractive power, that a focal length of the objective optical system can be shorter than that of the eyepiece optical system, and that the view finder satisfies the following condition (7):

$$0.52<H(\text{max})/fe<1 \qquad (7)$$

wherein a reference symbol H (max) represents a maximum value of a diameter of the visual field frame and a reference symbol fe designates a focal length of an optical system as a whole which is located on an emergency side of the intermediate image.

The real image type view finder having the sixth composition according to the present invention is compact and has favorable optical performance since the objective optical system used in the view finder comprises the first positive lens unit, the second negative lens unit, the third negative lens unit and the fourth positive lens unit.

Furthermore, when the focal length of the objective optical system can be shorter than that of the eyepiece optical system, it is possible to lower a magnification of the real image type view finder to 1 or lower, thereby enlarging a field angle.

The condition (7) is adopted for enlarging an angle of emergence of the view finder.

For enlarging the angle of emergence of the view finder, it is sufficient to enlarge an intermediate image to be formed by the objective optical system that is, a diameter of the visual field frame or shorten a focal length of the eyepiece optical system.

If a lower limit of 0.52 of the condition (7) is exceeded, the view finder will allow only a small image to be observed. If an upper limit of 1 of the condition (7) is exceeded, in contrast, the view finder will make an image too large to comprehend an entire range of visual field, thereby making it difficult, for example, to quickly determine a composition of a view.

Furthermore the sixth composition in which the photographic optical system is configured separately from the view finder optical system permits determining the diameter of the visual field frame [H (max)] independently of a size of an image pickup surface, thereby being advantageous for configuring the eyepiece optical system compact.

For the view finder having the above described sixth composition, it is desirable that the eyepiece optical system satisfies the following condition (8):

$$13.0 \text{ mm} < fe < 16.5 \text{ mm} \tag{8}$$

wherein a reference symbol fe represents a focal length of the eyepiece optical system.

For the view finder having the sixth composition which satisfies the condition (7) as described above, the above-mentioned condition (8) is required in addition to the condition (7) for reserving a space for disposing image erecting means and configuring the real image type view finder compact.

If a lower limit of the condition (8) is exceeded, a distance as measured from a front principal point of the eyepiece optical system to the visual field frame along an optical axis will be shortened and the view finder has a magnification range including 1× and lower, whereby a distance as measured from a rear principal point to the visual field frame along the optical axis will also be shortened and it will be difficult to dispose an image erecting optical system.

If an upper limit of the condition (8) is exceeded, in contrast, the diameter of the visual field frame [H (max)] must be prolonged to enlarge an angle of emergence, whereby the objective optical system is enlarged and an extent of the angle of emergence cannot be balanced with size of the view finder.

Furthermore, it is more desirable to satisfy, in place of the above-mentioned condition (8), the following condition (8-1):

$$13.5 \text{ mm} < fe < 16.5 \text{ mm} \tag{8-1}$$

For the real image type view finder having the above described fifth or sixth composition according to the present invention, it is desirable to change a focal length of the objective optical system by moving at least two lens units along different loci in the objective optical system.

For the real image type view finder having one of the above described first through sixth compositions and the like according to the present invention, it is desirable to compose each lens unit of the objective optical system of a single lens element so that the view finder can be composed of a small number of optical parts at a low cost.

Since the present invention has an object to provide a view finder having a high vari-focal ratio, it is desirable to configure an objective optical system to be used in the real image type view finder according to the present invention as a vari-focal objective optical system which has a vari-focal ratio of 3.5 or higher.

For the real image type view finder according to the present invention, it is desirable to configure the objective optical system so as to move the second lens unit and the third lens unit for a magnification change while keeping the first lens unit and the fourth lens unit stationary so that the view finder is compact and has a mechanical advantage.

For the real image type view finder having one of the first through fourth compositions according to the present invention, it is desirable to dispose a flare stop on each lens unit so that unwanted rays can be intercepted during the magnification change.

Furthermore, when an aperture stop which is capable of changing an aperture diameter is disposed in the objective optical system, the aperture stop can serve not only as an aperture stop but also as a flare stop and sufficiently intercept the unwanted rays in each condition from a wide position to a tele position.

It is effective to dispose the above described aperture stop, for example, between the second lens unit and the third lens unit.

It is desirable to configure a manufacturing method of the real image type view finder having the of the above described first through fourth compositions and the like so as to comprise a step of performing diopter adjustment for a different specification, for example, the above described first specification or second specification by changing locations of the first lens unit, the second lens unit and the third lens unit all together.

The view finder manufactured by this method is configured to comprise an LCD, for example, disposed in the vicinity of the intermediate image for the first specification and an airspace, for example, in the vicinity of the intermediate image for the second specification. In this case, the diopter adjustment for the second specification can be performed by shifting all the first lens unit, the second lens unit and the third lens unit on a side of an exit pupil from locations of these lens units for the first specification.

It is desirable that the manufacturing method of the real image type view finder having one of the above described first through fourth composition and the like to comprise a step of adjusting a diopter deviation at an assembling stage by changing a location only of the second lens unit or locations of the second lens unit and the third lens unit all together.

It is possible to compose an image pickup apparatus comprising the real image type view finder according to the present invention by composing the above described real image type view finder according to the present invention separately from a photographic optical system, and disposing the view finder and the photographic optical system so that an optical axis of incidence of the photographic optical system is nearly in parallel with an optical axis of incidence of the view finder according to the present invention.

Now, description will be made of embodiments of the real image type view finder according to the present invention. The embodiments have compositions shown in FIGS. 2 through 9 and numerical data which is listed below:

Embodiment 1

Finder magnification = 0.40~1.58, z = 3.963,
Angle of incidence (degrees) = 25.3~6.1
Pupil diameter (mm) = 5
$r_1$ = 16.5249
   $d_1$ = 3.0500      $n_1$ = 1.52542      $v_1$ = 55.78
$r_2$ = −15.2884 (aspherical surface)
   $d_2$ = 0.7300
$r_3$ = −13.8221
   $d_3$ = 0.8000      $n_2$ = 1.58423      $v_2$ = 30.49
$r_4$ = 10.4061 (aspherical surface)
   $d_4$ = 2.9000
$r_5$ = −6.3215 (aspherical surface)
   $d_5$ = 0.8000      $n_3$ = 1.49235      $v_3$ = 57.86
$r_6$ = 49.1476
   $d_6$ = 8.9000
$r_7$ = 9.8371 (aspherical surface)
   $d_7$ = 3.0000      $n_4$ = 1.52542      $v_4$ = 55.78
$r_8$ = −8.3996 (aspherical surface)
   $d_8$ = 0.3000
$r_9$ = ∞
   $d_9$ = 19.8095     $n_5$ = 1.52542      $v_5$ = 55.78
$r_{10}$ = ∞
   $d_{10}$ = 3.0655
$r_{11}$ = ∞ (intermediate image)
   $d_{11}$ = 0
$r_{12}$ = 20.8562
   $d_{12}$ = 29.3500  $n_6$ = 1.52542      $v_6$ = 55.78
$r_{13}$ = ∞
   $d_{13}$ = 1.2000
$r_{14}$ = 13.8789 (aspherical surface)
   $d_{14}$ = 2.1000   $n_7$ = 1.49235      $v_7$ = 57.86
$r_{15}$ = −40.4230
   $d_{15}$ = 16.5000
aspherical surface coefficients
(3rd surface)    K = −5.6133, $A_2$ = 0, $A_4$ = 8.0814 × $10^{-5}$
                 $A_6$ = 7.7162 × $10^{-7}$, $A_8$ = −7.4732 × $10^{-8}$
                 $A_{10}$ = 1.2054 × $10^{-9}$
(4th surface)    K = −1.6293, $A_2$ = 0, $A_4$ = −1.8982 × $10^{-3}$
                 $A_6$ = 6.2729 × $10^{-5}$, $A_8$ = −1.7950 × $10^{-6}$
                 $A_{10}$ = −1.7119 × $10^{-7}$
(5th surface)    K = 0.3589, $A_2$ = 0, $A_4$ = −2.3472 × $10^{-4}$
                 $A_6$ = −1.0714 × $10^{-4}$, $A_8$ = 1.41914 × $10^{-5}$
                 $A_{10}$ = −7.5033 × $10^{-7}$
(7th surface)    K = 0.0836, $A_2$ = 0, $A_4$ = 2.8776 × $10^{-5}$
                 $A_6$ = −3.8782 × $10^{-5}$, $A_8$ = 1.5111 × $10^{-6}$
                 $A_{10}$ = −3.3333 × $10^{-9}$
(8th surface)    K = −1.1580, $A_2$ = 0, $A_4$ = 5.4874 × $10^{-4}$
                 $A_6$ = −3.1641 × $10^{-5}$, $A_8$ = 9.9541 × $10^{-7}$
                 $A_{10}$ = −1.9887 × $10^{-9}$
(14th surface)   K = −1.3810, $A_2$ = 0, $A_4$ = −2.0827 × $10^{-4}$
                 $A_6$ = 5.3546 × $10^{-6}$, $A_8$ = −2.6643 × $10^{-7}$
                 $A_{10}$ = 3.4809 × $10^{-9}$

| Distances among zoom lens units | $D_2$ | $D_4$ | $D_6$ |
|---|---|---|---|
| Wide position | 0.7300 | 2.9000 | 8.9000 |
| Intermediate focal length | 4.4430 | 1.8103 | 6.2767 |
| Tele position | 6.4000 | 5.0300 | 1.1000 |

$f_1$ = 15.6304, $f_2$ = −10.0392, $f_3$ = −11.3223, $f_4$ = 9.1412
Lr = 20.441, S = 20.18, Lr/S = 1.0129
$f_4/(f_3 \times z)$ = −0.2037, $|f_2|/fE$ = 0.4776
$v_2$ (2) = 30.49, $v_3$ (3) = 57.86
$(f_1 \times f_2)/(f_3 \times f_4)$ = 1.5161, H (max)/2 = 3.641
H (max) = 7.28, fe = 21.02, H (max)/fe = 0.346
L2 = 5.670, L3 = 7.800, (L3−L2) × z/L2 = 1.489

Embodiment 2

Finder magnification = 0.40~1.59, z = 3.964,
Angle of incidence (degrees) = 25.3~6.0
Pupil diameter (mm) = 5
$r_1$ = 14.7217
   $d_1$ = 3.1342      $n_1$ = 1.49235      $v_1$ = 57.86
$r_2$ = −15.5867 (aspherical surface)
   $d_2$ = 0.7237
$r_3$ = −14.2884
   $d_3$ = 0.8000      $n_2$ = 1.58423      $v_2$ = 30.49

-continued $r_4$ = 9.3945 (aspherical surface)
   $d_4$ = 2.9842
$r_5$ = −5.8792 (aspherical surface)
   $d_5$ = 0.7200      $n_3$ = 1.49235      $v_3$ = 57.86
$r_6$ = ∞
   $d_6$ = 8.7131
$r_7$ = 8.9005 (aspherical surface)
   $d_7$ = 3.1000      $n_4$ = 1.49235      $v_4$ = 57.86
$r_8$ = −8.0221 (aspherical surface)
   $d_8$ = 0.3000
$r_9$ = ∞
   $d_9$ = 19.8133     $n_5$ = 1.52542      $v_5$ = 55.78
$r_{10}$ = ∞
   $d_{10}$ = 3.0655
$r_{11}$ = ∞ (intermediate image)
   $d_{11}$ = 0
$r_{12}$ = 20.1127
   $d_{12}$ = 29.3500  $n_6$ = 1.52542      $v_6$ = 55.78
$r_{13}$ = ∞
   $d_{13}$ = 1.2000
$r_{14}$ = 13.5416 (aspherical surface)
   $d_{14}$ = 2.1105   $n_7$ = 1.49235      $v_7$ = 57.86
$r_{15}$ = −44.0049
   $d_{15}$ = 16.5000
aspherical surface coefficients
(2nd surface)    K = −5.1981, $A_2$ = 0, $A_4$ = 1.1712 × $10^{-4}$
                 $A_6$ = 1.5080 × $10^{-7}$, $A_8$ = −6.9821 × $10^{-8}$
                 $A_{10}$ = 1.2409 × $10^{-9}$
(4th surface)    K = −1.0357, $A_2$ = 0, $A_4$ = −2.1676 × $10^{-3}$
                 $A_6$ = 7.9331 × $10^{-5}$, $A_8$ = −4.3248 × $10^{-6}$
                 $A_{10}$ = −4.2958 × $10^{-8}$
(5th surface)    K = −0.1064, $A_2$ = 0, $A_4$ = −8.1432 × $10^{-4}$
                 $A_6$ = −6.6535 × $10^{-5}$, $A_8$ = 4.9274 × $10^{-6}$
                 $A_{10}$ = −2.1903 × $10^{-7}$
(7th surface)    K = −1.4125, $A_2$ = 0, $A_4$ = −2.0404 × $10^{-5}$
                 $A_6$ = 1.5401 × $10^{-5}$, $A_8$ = 1.2201 × $10^{-6}$
                 $A_{10}$ = 3.3333 × $10^{-9}$
(8th surface)    K = −0.9964, $A_2$ = 0, $A_4$ = 4.5920 × $10^{-4}$
                 $A_6$ = −2.3832 × $10^{-5}$, $A_8$ = 1.3183 × $10^{-6}$
                 $A_{10}$ = 1.9887 × $10^{-9}$
(14th surface)   K = 4.7904, $A_2$ = 0, $A_4$ = −3.5083 × $10^{-4}$
                 $A_6$ = −3.9110 × $10^{-6}$, $A_8$ = 3.5330 × $10^{-8}$
                 $A_{10}$ = −1.0187 × $10^{-8}$

| Distances among zoom lens units | $D_2$ | $D_4$ | $D_6$ |
|---|---|---|---|
| Wide position | 0.7237 | 2.9842 | 8.7131 |
| Intermediate focal length | 4.5180 | 1.7016 | 6.2015 |
| Tele position | 6.6291 | 4.7725 | 1.0193 |

$f_1$ = 15.9203, $f_2$ = −9.5821, $f_3$ = −11.9411, $f_4$ = 9.1209
Lr = 20.441, S = 20.18, Lr/S = 1.0132
$f_4/(f_3 \times z)$ = −0.1927, $|f_2|/fE$ = 0.4561
$v_2$ (2) = 30.49, $v_3$ (3) = 57.86
$(f_1 \times f_2)/(f_3 \times f_4)$ = 1.4007, H (max)/2 = 3.639
H (max) = 7.28, fe = 21.01, H (max)/fe = 0.346
L2 = 5.905, L3 = 7.693, (L3−L2) × z/L2 = 1.200

Embodiment 3

Finder magnification = 0.40~1.54, z = 3.857,
Angle of incidence (degrees) = 25.2~6.2
Pupil diameter (mm) = 5
$r_1$ = 13.7724
   $d_1$ = 2.8695      $n_1$ = 1.49241      $v_1$ = 57.66
$r_2$ = −16.3135 (aspherical surface)
   $d_2$ = 0.7165
$r_3$ = −18.6363
   $d_3$ = 0.8500      $n_2$ = 1.58423      $v_2$ = 30.49
$r_4$ = 7.4811 (aspherical surface)
   $d_4$ = 2.5976
$r_5$ = −8.4576
   $d_5$ = 0.8000      $n_3$ = 1.58423      $v_3$ = 30.49
$r_6$ = 80.2126
   $d_6$ = 8.9643
$r_7$ = 8.5109 (aspherical surface)
   $d_7$ = 3.4000      $n_4$ = 1.49241      $v_4$ = 57.66
$r_8$ = −8.4520 (aspherical surface)
   $d_8$ = 1.6000
$r_9$ = ∞
   $d_9$ = 17.4556     $n_5$ = 1.52542      $v_5$ = 55.78

-continued $r_{10} = \infty$
$d_{10} = 3.0655$
$r_{11} = \infty$ (intermediate image)
$d_{11} = 1.1000$
$r_{12} = 24.5365$
$d_{12} = 28.1500$ $n_6 = 1.52542$ $\nu_6 = 55.78$
$r_{13} = \infty$
$d_{13} = 1.2000$
$r_{14} = 16.8225$ (aspherical surface)
$d_{14} = 2.3195$ $n_7 = 1.49241$ $\nu_7 = 57.66$
$r_{15} = -27.6475$
$d_{15} = 16.5000$
aspherical surface coefficients
(2nd surface) $K = -5.7757, A_2 = 0, A_4 = 1.0682 \times 10^{-4}$
$A_6 = -2.2922 \times 10^{-6}, A_8 = 3.9470 \times 10^{-8}$
$A_{10} = -1.9498 \times 10^{-12}$
(4th surface) $K = -1.4369, A_2 = 0, A_4 = -5.3276 \times 10^{-4}$
$A_6 = -3.9697 \times 10^{-5}, A_8 = 1.8773 \times 10^{-5}$
$A_{10} = -1.7799 \times 10^{-6}$
(7th surface) $K = -2.0847, A_2 = 0, A_4 = -1.9164 \times 10^{-4}$
$A_6 = 1.5882 \times 10^{-5}, A_8 = 9.7254 \times 10^{-7}$
$A_{10} = -1.5916 \times 10^{-8}$
(8th surface) $K = -0.4188, A_2 = 0, A_4 = 2.8884 \times 10^{-4}$
$A_6 = 1.9690 \times 10^{-7}, A_8 = 1.3051 \times 10^{-6}$
$A_{10} = 1.2906 \times 10^{-9}$
(14th surface) $K = 1.0030, A_2 = 0, A_4 = -9.4555 \times 10^{-5}$
$A_6 = 4.0781 \times 10^{-7}, A_8 = 5.1764 \times 10^{-8}$
$A_{10} = 8.0882 \times 10^{-10}$

| Distances among zoom lens units | $D_2$ | $D_4$ | $D_6$ |
|---|---|---|---|
| Wide position | 0.7165 | 2.5976 | 8.9643 |
| Intermediate focal length | 4.4523 | 1.4784 | 6.3491 |
| Tele position | 6.4168 | 4.8183 | 1.0434 |

$f_1 = 15.6586, f_2 = -9.0288, f_3 = -13.0522, f_4 = 9.2219$
$Lr = 20.754, S = 20.2, Lr/S = 1.0274$
$f_4/(f_3 \times z) = -0.1832, |f_2|/fE = 0.4299$
$\nu_2(2) = 30.49, \nu_3(3) = 30.49$
$(f_1 \times f_2)/(f_3 \times f_4) = 1.1746, H(max)/2 = 3.590$
$H(max) = 7.18, fe = 21.00, H(max)/fe = 0.342$
$L2 = 5.700, L3 = 7.921, (L3-L2) \times z/L2 = 1.503$ Embodiment 4

Finder magnification = 0.40~1.54, z = 3.857,
Angle of incidence (degrees) = 25.1~6.2
Pupil diameter (mm) = 5
$r_1 = 17.5506$
$d_1 = 2.5564$ $n_1 = 1.49241$ $\nu_1 = 57.66$
$r_2 = -14.8659$ (aspherical surface)
$d_2 = 0.7908$
$r_3 = -16.5413$
$d_3 = 0.9000$ $n_2 = 1.58423$ $\nu_2 = 30.49$
$r_4 = 20.8906$ (aspherical surface)
$d_4 = 2.2947$
$r_5 = -7.5695$
$d_5 = 0.8000$ $n_3 = 1.58423$ $\nu_3 = 30.49$
$r_6 = 17.8335$
$d_6 = 9.3593$
$r_7 = 8.4700$ (aspherical surface)
$d_7 = 3.5000$ $n_4 = 1.49241$ $\nu_4 = 57.66$
$r_8 = -8.0450$ (aspherical surface)
$d_8 = 1.5988$
$r_9 = \infty$
$d_9 = 15.8000$ $n_5 = 1.52542$ $\nu_5 = 55.78$
$r_{10} = \infty$
$d_{10} = 3.0655$
$r_{11} = \infty$ (intermediate image)
$d_{11} = 2.1000$
$r_{12} = 29.8896$
$d_{12} = 27.4991$ $n_6 = 1.52542$ $\nu_6 = 55.78$
$r_{13} = \infty$
$d_{13} = 0.6991$
$r_{14} = 19.8152$
$d_{14} = 2.3505$ $n_7 = 1.49241$ $\nu_7 = 57.66$
$r_{15} = -22.7187$ (aspherical surface)
$d_{15} = 16.5000$ -continued aspherical surface coefficients
(2nd surface) $K = -7.5632, A_2 = 0, A_4 = -1.6283 \times 10^{-5}$
$A_6 = 6.5852 \times 10^{-7}, A_8 = -3.8706 \times 10^{-8}$
$A_{10} = 1.0413 \times 10^{-9}$
(4th surface) $K = -1.2812, A_2 = 0, A_4 = -8.7560 \times 10^{-4}$
$A_6 = -1.0971 \times 10^{-5}, A_8 = 2.0548 \times 10^{-6}$
$A_{10} = -8.6194 \times 10^{-8}$
(7th surface) $K = -2.3737, A_2 = 0, A_4 = 1.2104 \times 10^{-4}$
$A_6 = -2.6389 \times 10^{-5}, A_8 = 2.0345 \times 10^{-6}$
$A_{10} = -1.2819 \times 10^{-8}$
(8th surface) $K = -0.2486, A_2 = 0, A_4 = 5.0207 \times 10^{-4}$
$A_6 = -4.4132 \times 10^{-6}, A_8 = -4.8835 \times 10^{-7}$
$A_{10} = 6.7496 \times 10^{-8}$
(15th surface) $K = -8.6172, A_2 = 0, A_4 = -4.7758 \times 10^{-5}$
$A_6 = 3.1500 \times 10^{-6}, A_8 = -1.6131 \times 10^{-7}$
$A_{10} = 3.4949 \times 10^{-9}$

| Distances among zoom lens units | $D_2$ | $D_4$ | $D_6$ |
|---|---|---|---|
| Wide position | 0.7908 | 2.2947 | 9.3593 |
| Intermediate focal length | 5.0016 | 1.1790 | 6.2643 |
| Tele position | 6.3473 | 5.0483 | 1.0492 |

$f_1 = 16.7819, f_2 = -15.6625, f_3 = -8.9912, f_4 = 9.0092$
$Lr = 20.826, S = 20.2, Lr/S = 1.0310$
$f_4/(f_3 \times z) = -0.2598, |f_2|/fE = 0.7458$
$\nu_2(2) = 30.49, \nu_3(3) = 30.49$
$(f_1 \times f_2)/(f_3 \times f_4) = 3.2448, H(max)/2 = 3.572$
$H(max) = 7.14, fe = 21.00, H(max)/fe = 0.340$
$L2 = 5.557, L3 = 7.761, (L3-L2) \times z/L2 = 1.530$ Embodiment 5

Finder magnification = 0.39~1.81, z = 4.691,
Angle of incidence (degrees) = 26.0~5.3
Pupil diameter (mm) = 5
$r_1 = 16.2219$
$d_1 = 2.0494$ $n_1 = 1.52542$ $\nu_1 = 57.86$
$r_2 = -16.3577$ (aspherical surface)
$d_2 = 0.1500$
$r_3 = -27.5035$
$d_3 = 0.8000$ $n_2 = 1.58423$ $\nu_2 = 30.49$
$r_4 = 8.8491$ (aspherical surface)
$d_4 = 2.3818$
$r_5 = -6.1117$
$d_5 = 0.8000$ $n_3 = 1.49235$ $\nu_3 = 57.86$
$r_6 = 169.3019$
$d_6 = 10.9983$
$r_7 = 7.6182$ (aspherical surface)
$d_7 = 3.0000$ $n_4 = 1.52542$ $\nu_4 = 57.86$
$r_8 = -13.7657$ (aspherical surface)
$d_8 = 0.3000$
$r_9 = \infty$
$d_9 = 19.8375$ $n_5 = 1.52542$ $\nu_5 = 55.78$
$r_{10} = \infty$
$d_{10} = 3.0655$
$r_{11} = \infty$ (intermediate image)
$d_{11} = 0$
$r_{12} = 15.2764$
$d_{12} = 29.3500$ $n_6 = 1.52542$ $\nu_6 = 55.78$
$r_{13} = \infty$
$d_{13} = 1.2000$
$r_{14} = 15.2205$ (aspherical surface)
$d_{14} = 2.1000$ $n_7 = 1.49235$ $\nu_7 = 57.86$
$r_{15} = -32.0000$
$d_{15} = 16.5000$
aspherical surface coefficients
(2nd surface) $K = -5.3164, A_2 = 0, A_4 = 9.0709 \times 10^{-5}$
$A_6 = 1.1923 \times 10^{-6}, A_8 = -9.6583 \times 10^{-8}$
$A_{10} = 1.6540 \times 10^{-9}$
(4th surface) $K = -1.5733, A_2 = 0, A_4 = -6.4161 \times 10^{-4}$
$A_6 = -1.1889 \times 10^{-4}, A_8 = 1.6807 \times 10^{-5}$
$A_{10} = -7.9022 \times 10^{-7}$
(5th surface) $K = 0.2689, A_2 = 0, A_4 = 6.3400 \times 10^{-4}$
$A_6 = -3.6063 \times 10^{-4}, A_8 = 5.9007 \times 10^{-5}$
$A_{10} = -2.9721 \times 10^{-6}$
(7th surface) $K = -0.3158, A_2 = 0, A_4 = 7.9692 \times 10^{-5}$
$A_6 = 2.9273 \times 10^{-5}, A_8 = 7.9350 \times 10^{-8}$
$A_{10} = -3.3333 \times 10^{-9}$
(8th surface) $K = -1.0279, A_2 = 0, A_4 = 8.3306 \times 10^{-4}$
$A_6 = 2.9815 \times 10^{-5}, A_8 = 0, A_{10} = 0$ -continued (14th surface)    $K = 1.5557, A_2 = 0, A_4 = -1.9080 \times 10^{-4}$
                  $A_6 = 9.3853 \times 10^{-6}, A_8 = -5.3593 \times 10^{-7}$
                  $A_{10} = 8.4903 \times 10^{-9}$ Distances among     $D_2$        $D_4$        $D_6$
zoom lens units
Wide position       0.1500       2.3818       10.9983
Intermediate        4.3564       1.5422       7.6315
focal length
Tele position       6.2304       7.1497       0.1500

$f_1 = 15.8448, f_2 = -11.3673, f_3 = -11.9628, f_4 = 9.8077$
$Lr = 20.441, S = 20.18, Lr/S = 1.0129$
$f_4/(f_3 \times z) = -0.1748, |f_2|/fE = 0.5413$
$v_2 (2) = 30.49, v_3 (3) = 57.86$
$(f_1 \times f_2)/(f_3 \times f_4) = 1.5351, H(max)/2 = 3.589$
$H(max) = 7.18, fe = 21.00, H(max)/fe = 0.342$
$L_2 = 6.080, L_3 = 10.848, (L_3-L_2) \times z/L_2 = 3.679$ Embodiment 6

Finder magnification = 0.75~1.97, z = 2.610,
Angle of incidence (degrees) = 25.0~9.0
Pupil diameter (mm) = 4
$r_1 = 14.1430$
    $d_1 = 4.4307$      $n_1 = 1.49241$      $v_1 = 57.66$
$r_2 = -93.8570$ (aspherical surface)
    $d_2 = 1.0000$
$r_3 = -45.0222$
    $d_3 = 1.0000$      $n_2 = 1.58423$      $v_2 = 30.49$
$r_4 = 7.6983$ (aspherical surface)
    $d_4 = 8.2200$
$r_5 = -7.4452$ (aspherical surface)
    $d_5 = 1.0000$      $n_3 = 1.58423$      $v_3 = 30.49$
$r_6 = -22.1783$
    $d_6 = 4.3967$
$r_7 = -39.5745$ (aspherical surface)
    $d_7 = 3.5608$      $n_4 = 1.49241$      $v_4 = 57.66$
$r_8 = -7.3936$ (aspherical surface)
    $d_8 = 0.5000$
$r_9 = 13.5435$
    $d_9 = 30.5567$      $n_5 = 1.52542$      $v_5 = 55.78$
$r_{10} = -30.8357$
    $d_{10} = 1.8124$
$r_{11} = \infty$ (intermediate image)
    $d_{11} = 1.9579$
$r_{12} = -966.4532$ (aspherical surface)
    $d_{12} = 17.5877$      $n_6 = 1.52542$      $v_6 = 55.78$
$r_{13} = -15.6640$
    $d_{13} = 1.4555$
$r_{14} = 26.8635$ (aspherical surface)
    $d_{14} = 3.5178$      $n_7 = 1.52542$      $v_7 = 55.78$
$r_{15} = -30.0042$ (aspherical surface)
    $d_{15} = 15.7650$ aspherical surface coefficients
(2nd surface)    $K = -7.5687, A_2 = 0, A_4 = 3.4692 \times 10^{-5}$
                 $A_6 = 3.6402 \times 10^{-8}, A_8 = -2.3523 \times 10^{-9}$
                 $A_{10} = 1.3740 \times 10^{-11}$
(4th surface)    $K = -7.0701, A_2 = 0, A_4 = 1.6823 \times 10^{-3}$
                 $A_6 = -5.5245 \times 10^{-5}, A_8 = 1.4212 \times 10^{-6}$
                 $A_{10} = -1.7785 \times 10^{-8}$
(5th surface)    $K = -0.1402, A_2 = 0, A_4 = 2.1767 \times 10^{-4}$
                 $A_6 = -2.6608 \times 10^{-5}, A_8 = 1.7239 \times 10^{-6}$
                 $A_{10} = 2.7839 \times 10^{-8}$
(7th surface)    $K = -3.8529, A_2 = 0, A_4 = -6.1850 \times 10^{-4}$
                 $A_6 = -3.0526 \times 10^{-5}, A_8 = 1.5408 \times 10^{-6}$
                 $A_{10} = -2.4826 \times 10^{-8}$
(8th surface)    $K = -1.1926, A_2 = 0, A_4 = -4.5785 \times 10^{-4}$
                 $A_6 = -1.4255 \times 10^{-5}, A_8 = 7.0625 \times 10^{-8}$
                 $A_{10} = -2.8914 \times 10^{-9}$
(12th surface)   $K = 0, A_2 = 0, A_4 = 1.4482 \times 10^{-4}$
                 $A_6 = -1.0162 \times 10^{-5}, A_8 = 0, A_{10} = 0$
(14th surface)   $K = 0, A_2 = 0, A_4 = -7.0138 \times 10^{-5}$
                 $A_6 = 7.6184 \times 10^{-8}, A_8 = 0, A_{10} = 0$
(15th surface)   $K = 0, A_2 = 0, A_4 = -5.0608 \times 10^{-5}$
                 $A_6 = 9.2944 \times 10^{-8}, A_8 = 0, A_{10} = 0$ Distances among     $D_2$        $D_4$        $D_6$
zoom lens units
Wide position       1.0000       8.2200       4.3967
Intermediate        5.4383       4.5522       3.6261
focal length
Tele position       8.9952       3.5489       1.0726

$f_1 = 25.3032, f_2 = -11.1746, f_3 = -19.6759, f_4 = 17.8146$
$Lr = 13.487, S = 23.61, Lr/S = 0.5713$
$f_4/(f_3 \times z) = -0.3469, |f_2|/fE = 0.7445$
$v_2 (2) = 30.49, v_3 (3) = 57.86$
$(f_1 \times f_2)/(f_3 \times f_4) = 0.8067, H(max)/2 = 4.605$
$H(max) = 9.21, fe = 15.01, H(max)/fe = 0.614$ Embodiment 7

Finder magnification = 0.56~1.95, z = 3.504,
Angle of incidence (degrees) = 32.4~9.0
Pupil diameter (mm) = 5
$r_1 = 17.5153$ (aspherical surface)
    $d_1 = 7.2532$      $n_1 = 1.49241$      $v_1 = 57.66$
$r_2 = -42.8141$ (aspherical surface)
    $d_2 = 1.0000$
$r_3 = -27.0058$ (aspherical surface)
    $d_3 = 1.0000$      $n_2 = 1.58423$      $v_2 = 30.49$
$r_4 = 6.5587$ (aspherical surface)
    $d_4 = 11.1968$
$r_5 = -6.0311$ (aspherical surface)
    $d_5 = 1.0000$      $n_3 = 1.58423$      $v_3 = 30.49$
$r_6 = -12.2696$
    $d_6 = 4.3499$
$r_7 = -9.8837$ (aspherical surface)
    $d_7 = 3.8942$      $n_4 = 1.49241$      $v_4 = 57.66$
$r_8 = -5.6473$ (aspherical surface)
    $d_8 = 0.5000$
$r_9 = 12.3615$ (aspherical surface)
    $d_9 = 30.3941$      $n_5 = 1.52542$      $v_5 = 55.78$
$r_{10} = -88.4033$
    $d_{10} = 1.7969$
$r_{11} = \infty$ (intermediate image)
    $d_{11} = 1.8361$
$r_{12} = -71.3837$ (aspherical surface)
    $d_{12} = 17.5214$      $n_6 = 1.52542$      $v_6 = 55.78$
$r_{13} = -15.1669$
    $d_{13} = 1.4283$
$r_{14} = 29.5261$ (aspherical surface)
    $d_{14} = 3.3776$      $n_7 = 1.52542$      $v_7 = 55.78$
$r_{15} = -27.4313$ (aspherical surface)
    $d_{15} = 15.7650$ aspherical surface coefficients
(1st surface)    $K = -0.0025, A_2 = 0, A_4 = 1.6129 \times 10^{-5}$
                 $A_6 = -1.6562 \times 10^{-8}, A_8 = -5.2942 \times 10^{-10}$
                 $A_{10} = 2.4014 \times 10^{-12}$
(2nd surface)    $K = -7.5644, A_2 = 0, A_4 = 7.9439 \times 10^{-5}$
                 $A_6 = -6.4247 \times 10^{-7}, A_8 = 3.1685 \times 10^{-9}$
                 $A_{10} = -6.4309 \times 10^{-12}$
(3rd surface)    $K = -0.0034, A_2 = 0, A_4 = 2.4666 \times 10^{-4}$
                 $A_6 = -5.6037 \times 10^{-6}, A_8 = 6.6385 \times 10^{-8}$
                 $A_{10} = -2.8442 \times 10^{-10}$
(4th surface)    $K = -7.1076, A_2 = 0, A_4 = 2.5295 \times 10^{-3}$
                 $A_6 = -6.8773 \times 10^{-5}, A_8 = 9.5420 \times 10^{-7}$
                 $A_{10} = -4.3823 \times 10^{-9}$
(5th surface)    $K = -0.1215, A_2 = 0, A_4 = 5.1814 \times 10^{-4}$
                 $A_6 = -1.1126 \times 10^{-4}, A_8 = 1.2404 \times 10^{-5}$
                 $A_{10} = -2.0551 \times 10^{-7}$
(7th surface)    $K = -3.8513, A_2 = 0, A_4 = -1.9076 \times 10^{-3}$
                 $A_6 = 2.4277 \times 10^{-5}, A_8 = -4.9073 \times 10^{-6}$
                 $A_{10} = 1.3939 \times 10^{-7}$
(8th surface)    $K = -1.1916, A_2 = 0, A_4 = -6.7233 \times 10^{-4}$
                 $A_6 = -2.0707 \times 10^{-5}, A_8 = 2.8726 \times 10^{-7}$
                 $A_{10} = -2.4127 \times 10^{-8}$
(9th surface)    $K = -0.0010, A_2 = 0, A_4 = 1.8337 \times 10^{-4}$
                 $A_6 = -5.8677 \times 10^{-6}, A_8 = 8.9164 \times 10^{-8}$
                 $A_{10} = -5.5392 \times 10^{-10}$
(12th surface)   $K = 0, A_2 = 0, A_4 = 1.4506 \times 10^{-3}$
                 $A_6 = -5.4943 \times 10^{-5}, A_8 = 0, A_{10} = 0$
(14th surface)   $K = 0, A_2 = 0, A_4 = -1.7615 \times 10^{-4}$
                 $A_6 = 2.6922 \times 10^{-6}, A_8 = 0, A_{10} = 0$
(15th surface)   $K = 0, A_2 = 0, A_4 = -1.2610 \times 10^{-4}$
                 $A_6 = 2.3118 \times 10^{-6}, A_8 = 0, A_{10} = 0$ Distances among     $D_2$        $D_4$        $D_6$
zoom lens units
Wide position       1.0000       11.1968      4.3499
Intermediate        6.4721       5.5961       4.4785
focal length
Tele position       10.8070      3.8554       1.8843

$f_1 = 26.2862, f_2 = -8.9343, f_3 = -21.5789, f_4 = 20.5304$

-continued

Lr = 13.322, S = 26.69, Lr/S = 0.4486
$f_4/(f_3 \times z) = -0.2715$, $|f_2|/fE = 0.5952$
$v_2$ (2) = 30.49, $v_3$ (3) = 57.86
$(f_1 \times f_2)/(f_3 \times f_4) = 0.5301$, H (max)/2 = 4.613
H (max) = 9.23, fe = 15.01, H (max)/fe = 0.615

Embodiment 8

Finder magnification = 0.40~1.54, z = 3.845,
Angle of incidence (degrees) = 25.0~6.1
Pupil diameter (mm) = 5

$r_1 = 16.9921$
  $d_1 = 2.9342$   $n_1 = 1.49241$   $v_1 = 57.66$
$r_2 = -15.3233$ (aspherical surface)
  $d_2 = 0.8702$
$r_3 = -14.3065$
  $d_3 = 0.9000$   $n_2 = 1.58423$   $v_2 = 30.49$
$r_4 = 25.5407$ (aspherical surface)
  $d_4 = 2.7399$
$r_5 = -7.6471$
  $d_5 = 0.9000$   $n_3 = 1.58423$   $v_3 = 30.49$
$r_6 = 14.1230$
  $d_6 = 8.2358$
$r_7 = 8.4441$ (aspherical surface)
  $d_7 = 3.7224$   $n_4 = 1.49241$   $v_4 = 57.66$
$r_8 = -8.9107$ (aspherical surface)
  $d_8 = 1.4972$
$r_9 = 37.0838$
  $d_9 = 15.8000$  $n_5 = 1.52542$   $v_5 = 55.78$
$r_{10} = \infty$
  $d_{10} = 3.0720$
$r_{11} = \infty$ (intermediate image)
  $d_{11} = 1.0000$
$r_{12} = 26.6283$
  $d_{12} = 28.0000$ $n_6 = 1.52542$  $v_6 = 55.78$
$r_{13} = \infty$
  $d_{13} = 1.2471$
$r_{14} = 17.6624$
  $d_{14} = 2.3692$  $n_7 = 1.49241$  $v_7 = 57.66$
$r_{15} = -25.3119$ (aspherical surface)
  $d_{15} = 16.5000$ aspherical surface coefficients
(2nd surface)   $K = -7.6388, A_2 = 0, A_4 = -4.6149 \times 10^{-5}$
                $A_6 = 3.9432 \times 10^{-6}, A_8 = -1.5735 \times 10^{-7}$
                $A_{10} = 2.5394 \times 10^{-9}$
(4th surface)   $K = -1.1448, A_2 = 0, A_4 = -1.1263 \times 10^{-3}$
                $A_6 = -5.4008 \times 10^{-6}, A_8 = 3.9973 \times 10^{-6}$
                $A_{10} = -2.2895 \times 10^{-7}$
(7th surface)   $K = -2.8699, A_2 = 0, A_4 = -1.2740 \times 10^{-4}$
                $A_6 = 1.8309 \times 10^{-5}, A_8 = 8.1522 \times 10^{-7}$
                $A_{10} = -2.1535 \times 10^{-8}$
(8th surface)   $K = 0.5654, A_2 = 0, A_4 = 3.3078 \times 10^{-4}$
                $A_6 = -1.2588 \times 10^{-5}, A_8 = 1.6935 \times 10^{-6}$
                $A_{10} = -1.0756 \times 10^{-8}$
(15th surface)  $K = -7.6631, A_2 = 0, A_4 = -1.7836 \times 10^{-5}$
                $A_6 = 1.8823 \times 10^{-6}, A_8 = -6.1586 \times 10^{-8}$
                $A_{10} = 1.0880 \times 10^{-9}$

| Distances among zoom lens units | $D_2$ | $D_4$ | $D_6$ |
|---|---|---|---|
| Wide position | 0.8702 | 2.7399 | 8.2358 |
| Intermediate focal length | 5.1539 | 1.2401 | 5.5131 |
| Tele position | 5.5961 | 4.6342 | 0.7905 |

$f_1 = 16.8683$, $f_2 = -15.5662$, $f_3 = -8.3639$, $f_4 = 9.4754$
Lr = 20.603, S = 21.8, Lr/S = 0.9451
$f_4/(f_3 \times z) = -0.2946$, $|f_2|/fE = 0.7412$
$v_2$ (2) = 30.49, $v_3$ (3) = 30.49
$(f_1 \times f_2)/(f_3 \times f_4) = 3.3132$, H (max)/2 = 3.570
H (max) = 7.14, fe = 21.00, H (max)/fe = 0.340
L2 = 5.726, L3 = 7.620, (L3–L2) × z/L2 = 1.272 wherein reference symbols $r_1$, $r_2$, . . . represent radii of curvature on respective lens surfaces, reference symbols $d_1$, $d_2$, . . . designate thicknesses of respective lens elements and airspaces reserved therebetween, reference symbols $n_1$, $n_2$. . . denote refractive indices of the respective lens elements, and reference symbols $v_1$, $v_2$, . . . represent Abbe's numbers of the respective lens elements.

In the numerical data listed above, all lengths such as $r_1$, $r_2$, . . . $d_1$, $d_2$, . . . , $n_1$, $n_2$, . . . Lr, S, fE, H(max), L2, L3 and the like are specified in mm.

Figure 2:
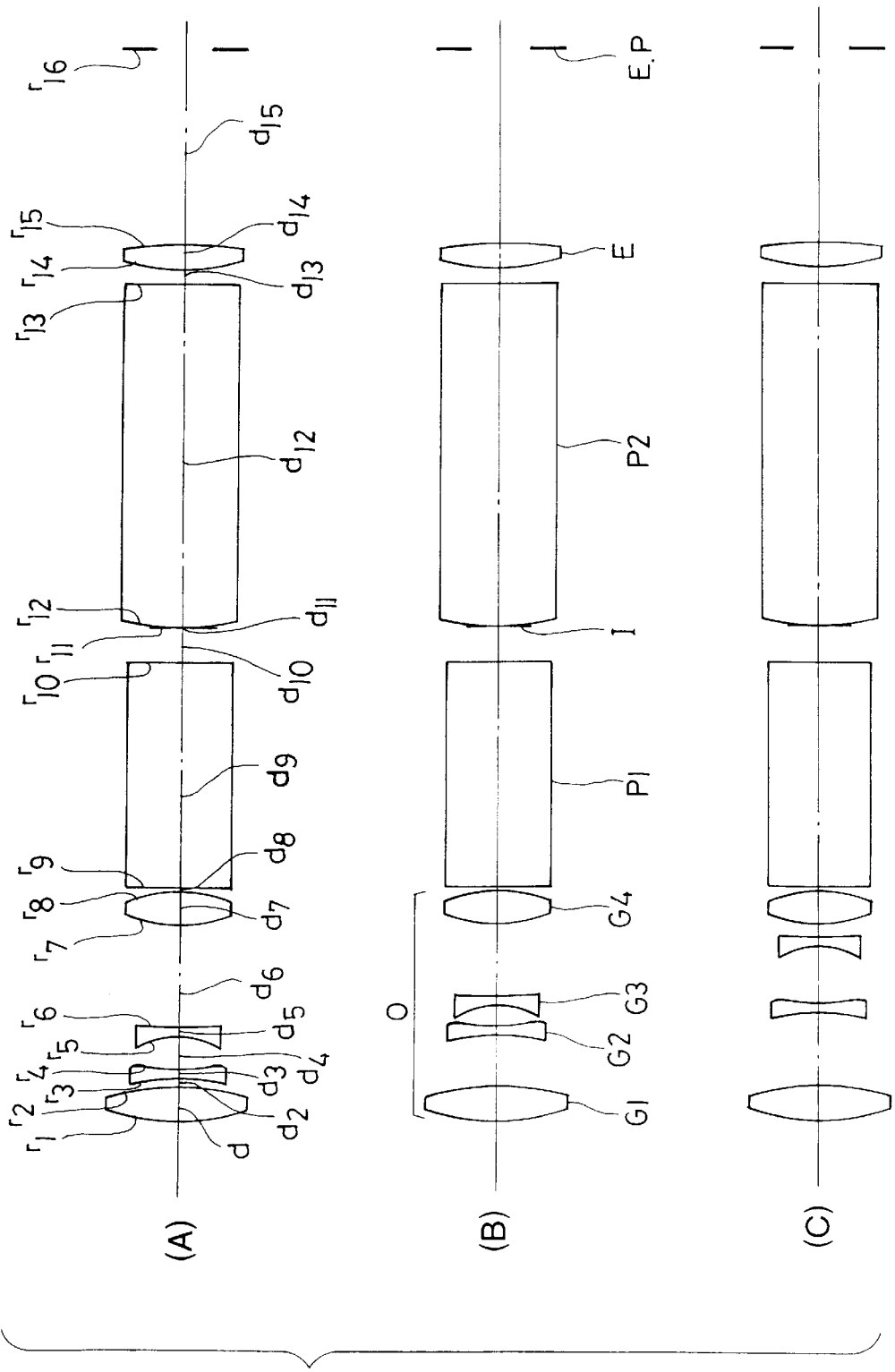
FIGS. 2 through 9 are sectional views showing compositions of first through eighth embodiment of the real image view finder according to the present invention.
Figure 3:
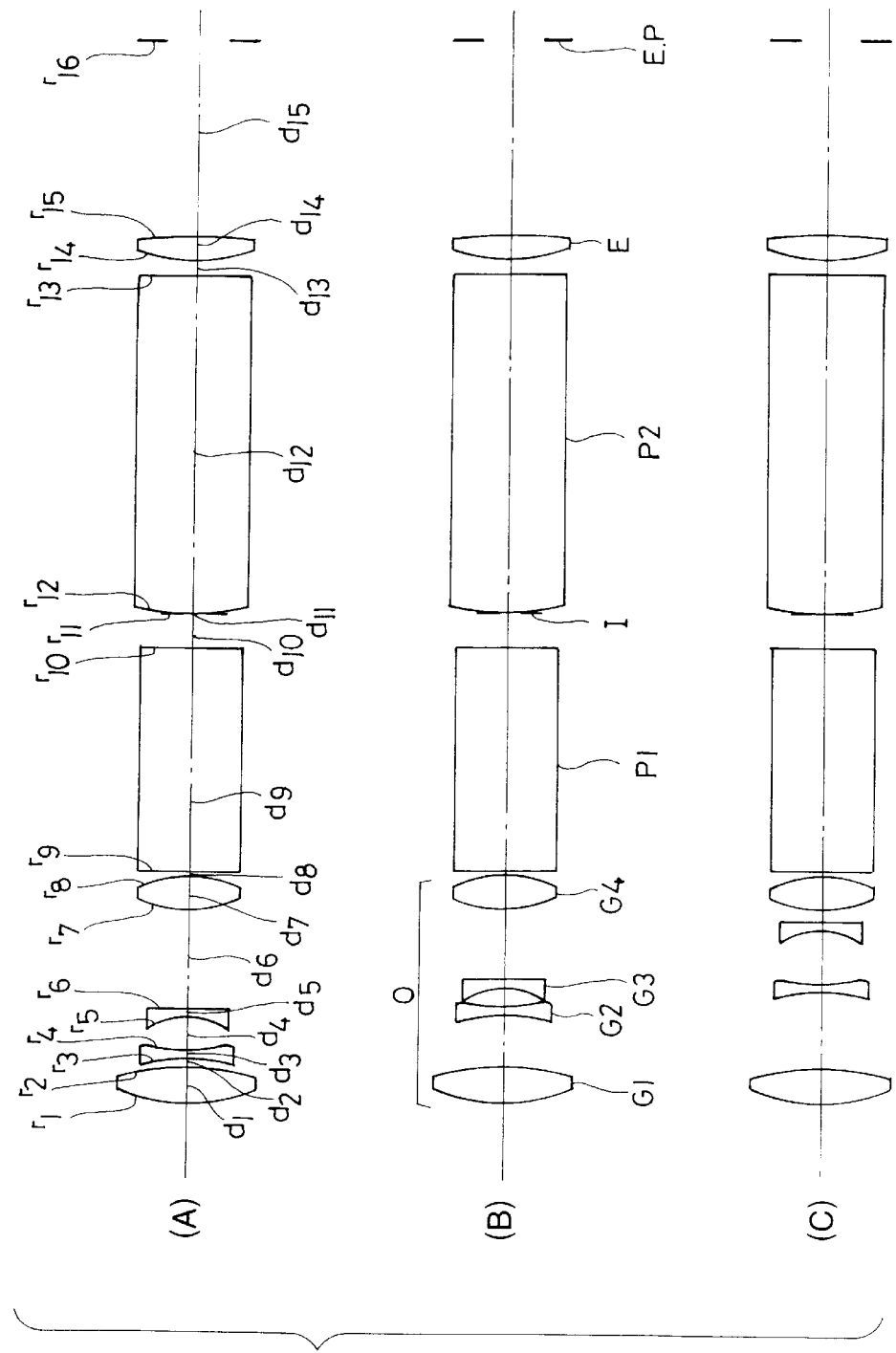
Figure 4:
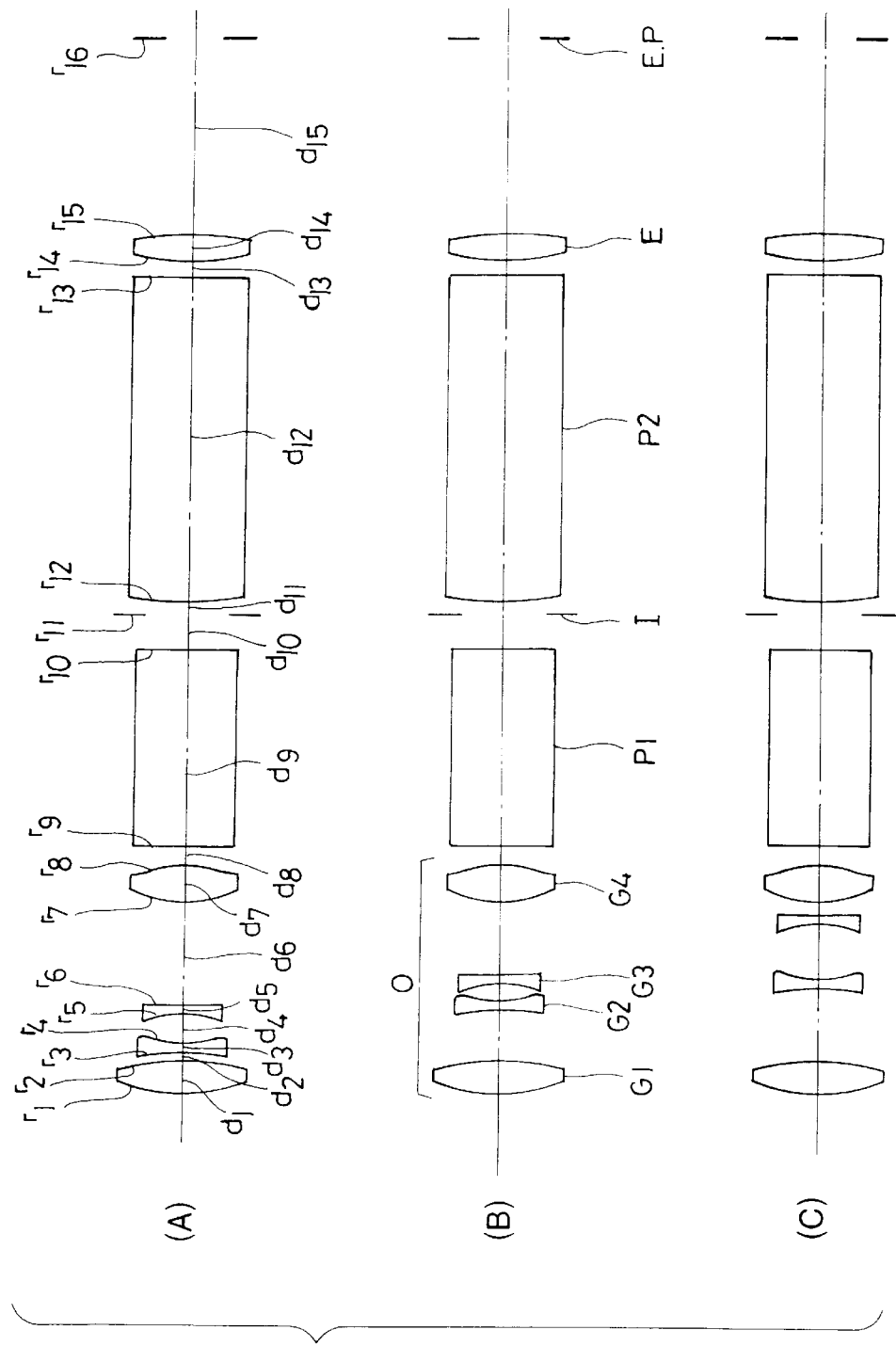
Figure 5:
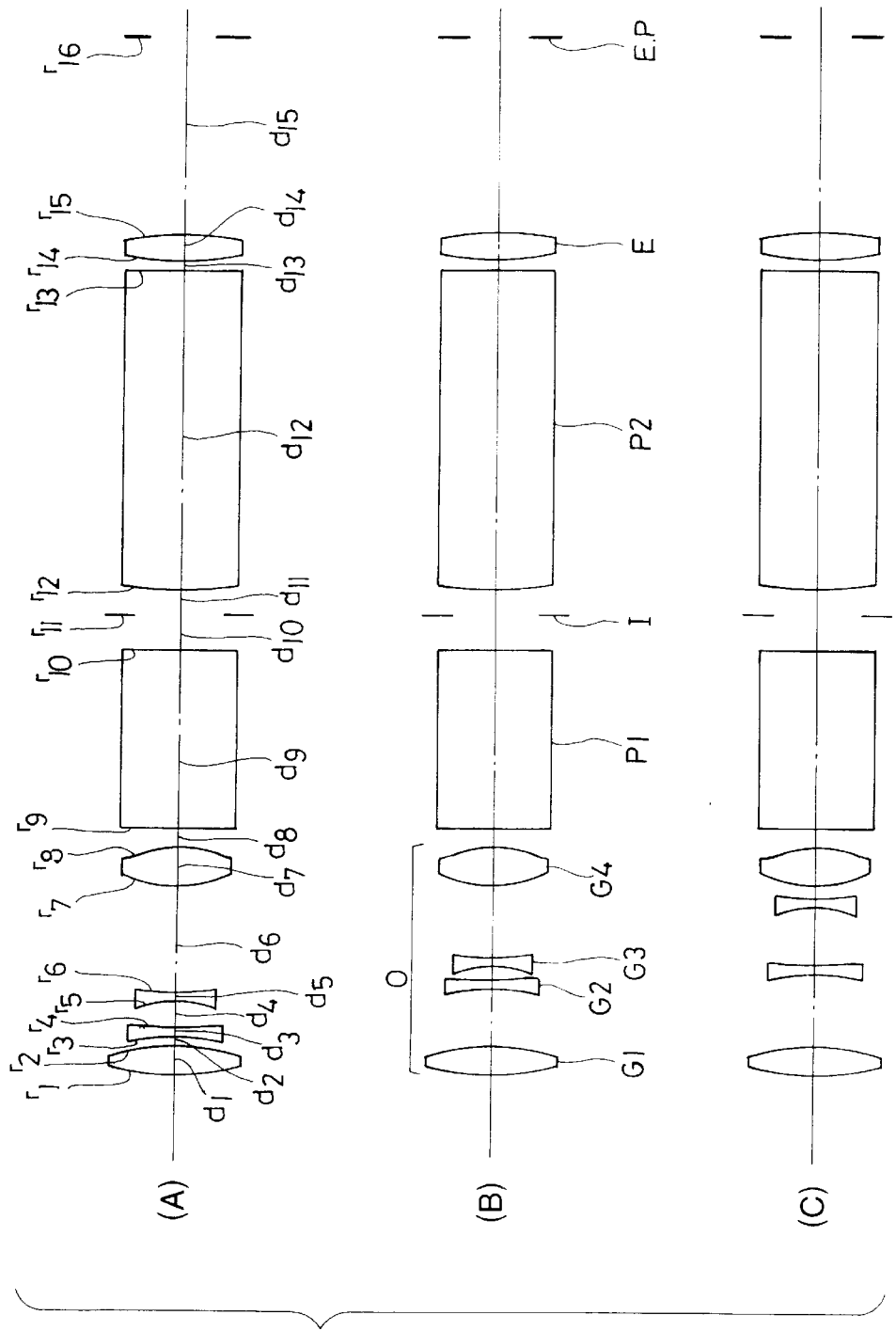
Figure 6:
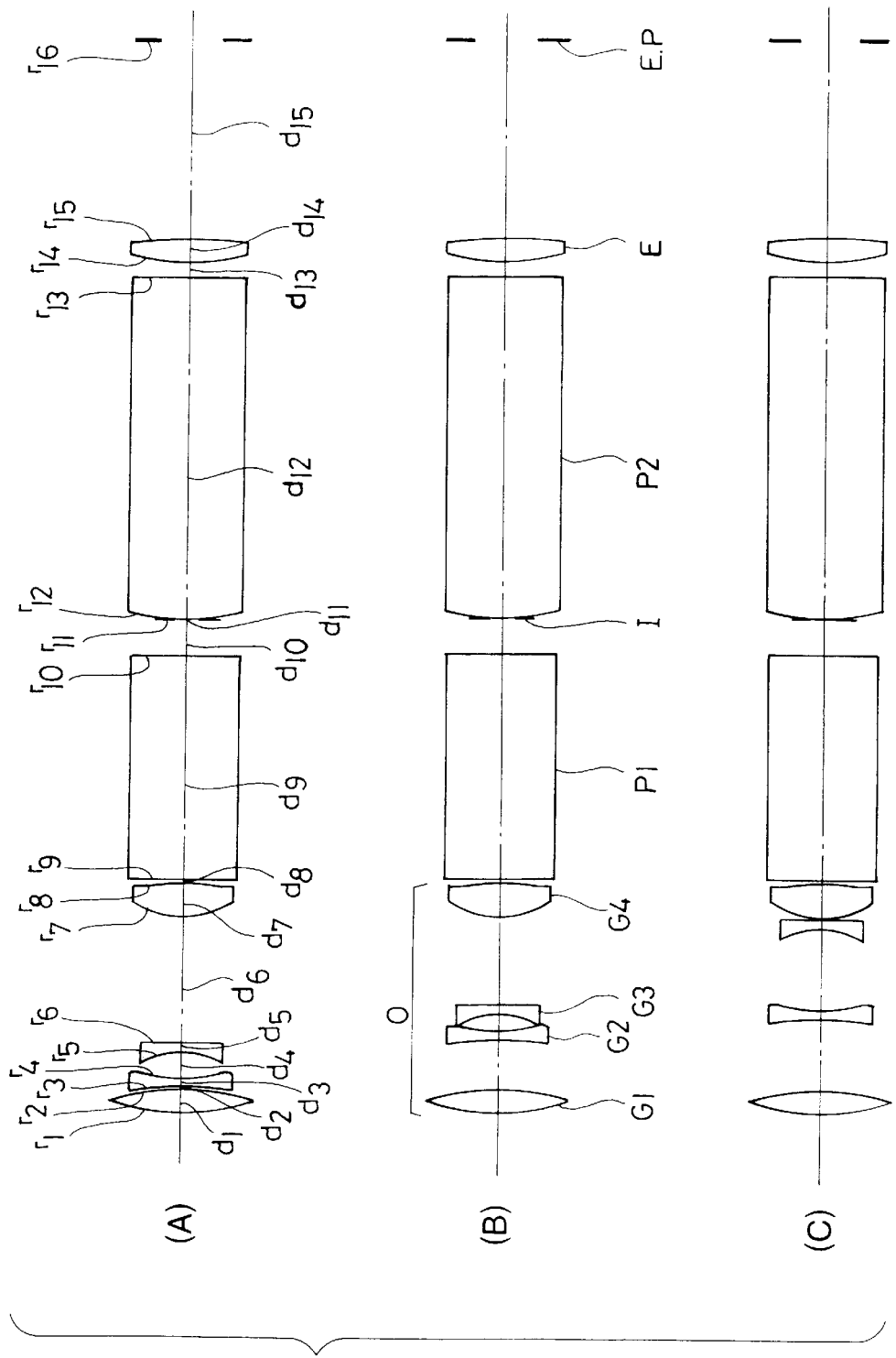

Out of these embodiments, the first embodiment has a composition shown in FIG. 2, wherein an objective optical system O ($r_1$ through $r_8$) comprises, in order from the object side, a first positive lens unit G1 ($r_1$ and $r_2$), a second negative lens unit G2 ($r_3$ and $r_4$), a third negative lens unit G3 ($r_5$ and $r_6$) and a fourth lens unit G4 ($r_7$ and $r_8$). Out of these lens units, the second lens unit G2 and the third lens unit G3 are moved for changing a magnification.

The first embodiment enhances freedom of prism configurations by reserving a sufficiently long back focal length of the objective optical system and a sufficiently long distance as measured from an intermediate image I ($r_{11}$) to an eyepiece optical system.

The second, third, fourth, fifth and eighth embodiments have compositions shown in FIGS. 3, 4, 5, 6 and 9 respectively which are similar to the composition of the first embodiment and characteristics which are similar to that of the above described first embodiment.

The view finder according to the second embodiment out of these embodiments is configured to comprise an airspace reserved between a first prism and a second prism, and allow an information display member such as an LCD to be inserted into this airspace. A condition where the information display member is disposed in the airspace between the first and second prisms of the view finder and a condition where the information display member is not disposed in the airspace are taken, for example, as a first specification and a second specification.

The view finder according to the second embodiment can be used in the condition of the first specification when the first lens unit G1, the second lens unit G2 and the third lens unit G3 are slided equally 0.45 mm on a side of a pupil in an entire zoom region from a wide position to a tele position in the condition of the second specification. In other words, the view finder according to the second embodiment is usable as a view finder having adequate diopter and favorable optical performance in the conditions of the two first and second specifications by moving the first lens unit G1 through the third lens unit G3 without exchanging a finder unit.

Though a height of the intermediate image is slightly changed when the specifications are changed as described above, the view finder can easily cope with such a change by modifying a size of a visual field frame.

Figure 10:
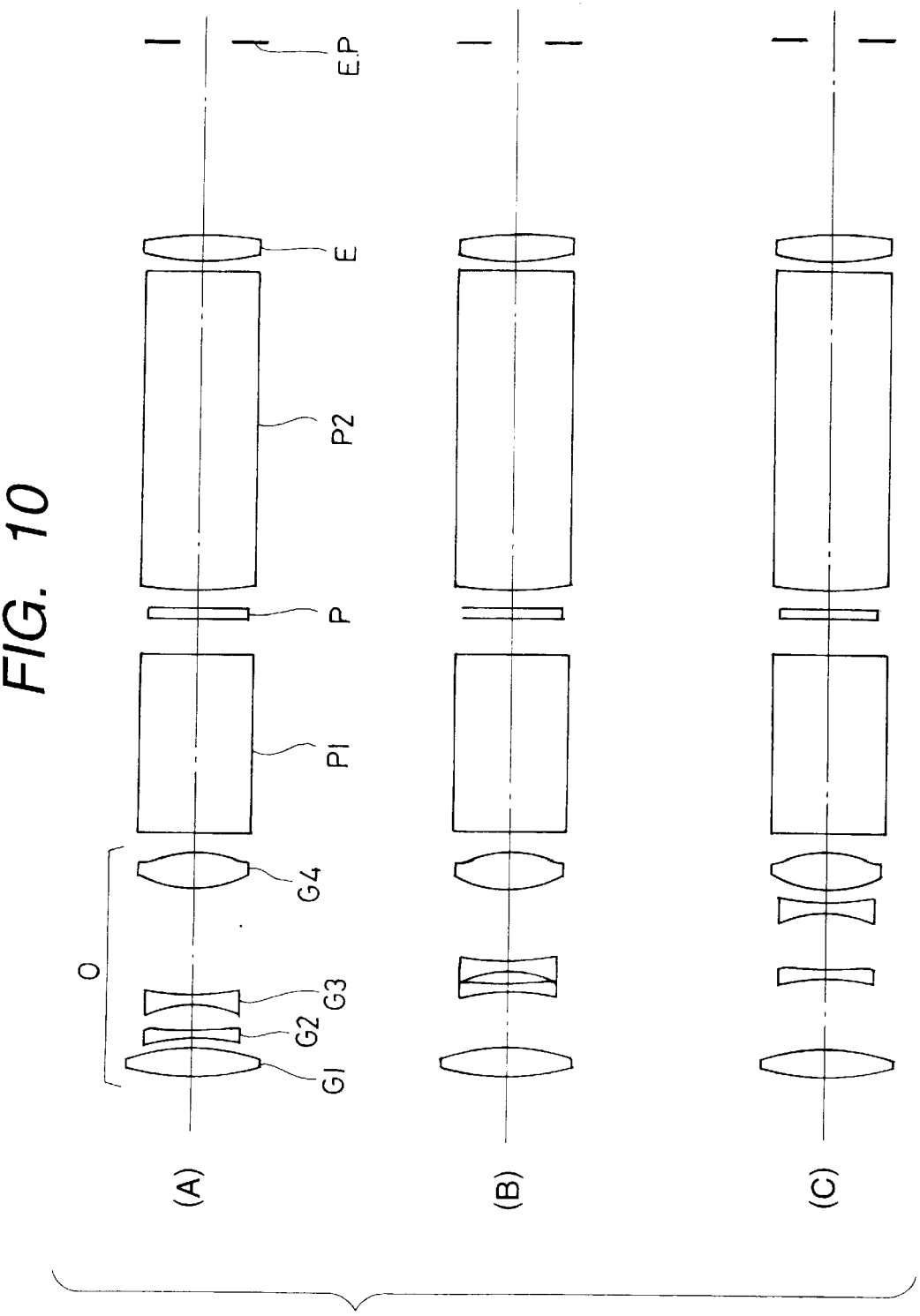
FIG. 10 is a sectional view showing a condition where a liquid crystal display element is disposed in the vicinity of an intermediate image in the fourth embodiment.
Figure 11A:
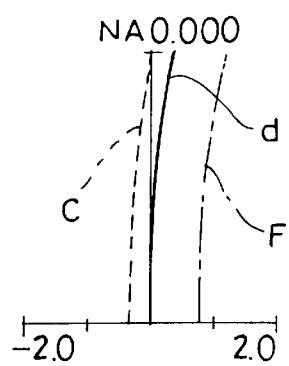
FIG. 11A, FIG. 11B and FIG. 11C show curves illustrating aberration characteristics of the first embodiment at a wide position.
Figure 11B:
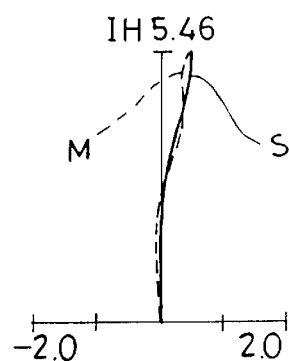
Figure 11C:
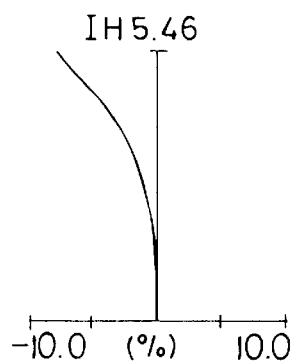
Figure 12A:
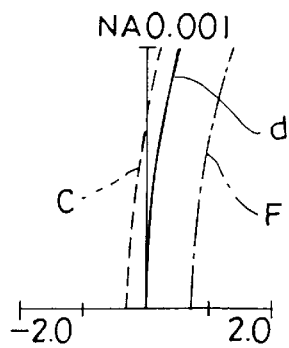
FIG. 12A, FIG. 12B and FIG. 12C show curves illustrating aberration characteristics of the first embodiment at an intermediate focal length.
Figure 12B:
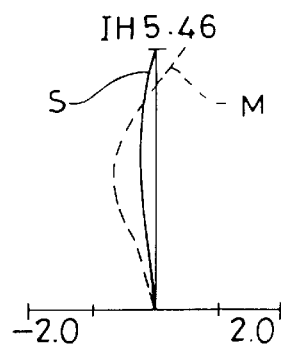
Figure 12C:
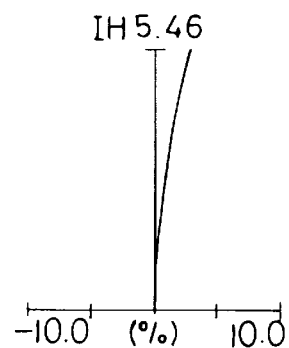
Figure 13A:
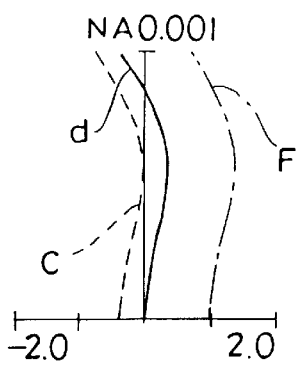
FIG. 13A, FIG. 13B and FIG. 13C show curves illustrating aberration characteristics of the first embodiment at a tele position.
Figure 13B:
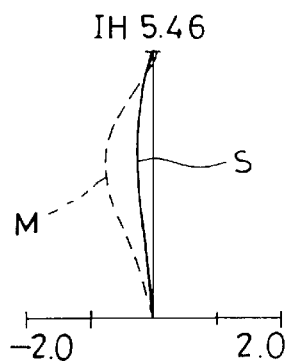
Figure 13C:
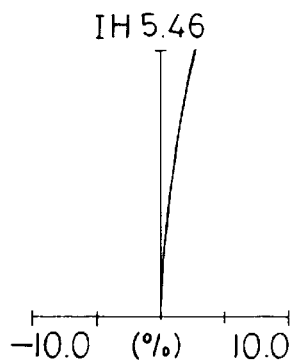

Furthermore, the fourth embodiment comprises a planar plate P which is disposed in the vicinity of the intermediate image between a first prism and a second prism as shown in FIG. 10 so that the planar plate P can be exchange when the planar plate P is contaminated with dust, whereby the fourth embodiment can be specified for easy exchange of the planar plate at a low cost.

Figure 9:
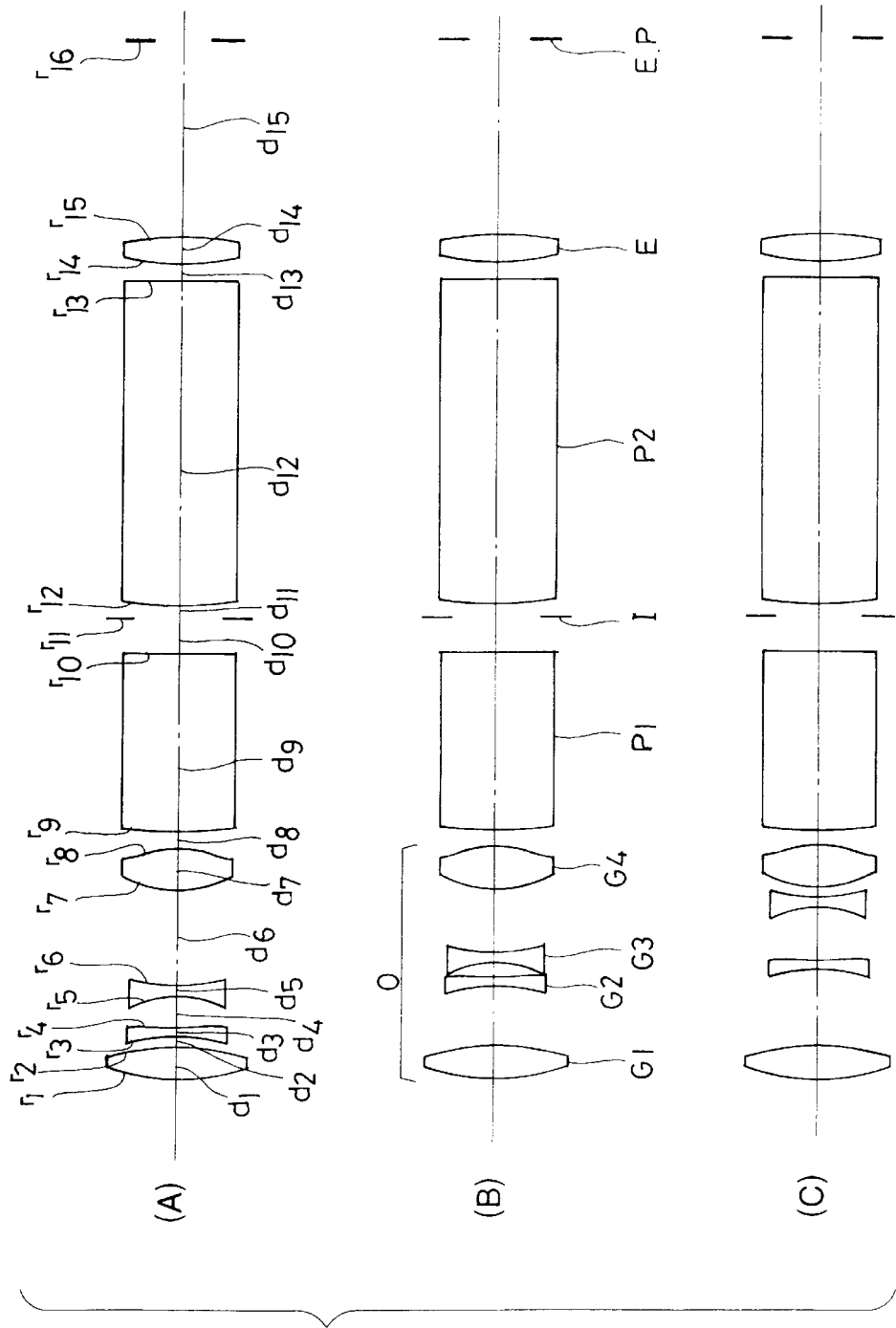

The eighth embodiment shown in FIG. 9 is an embodiment which uses a spherical surface as a surface of incidence of a first prism P1, that is, a surface ($r_9$) on a side of an objective optical system, for enhancing optical performance.

Figure 7:
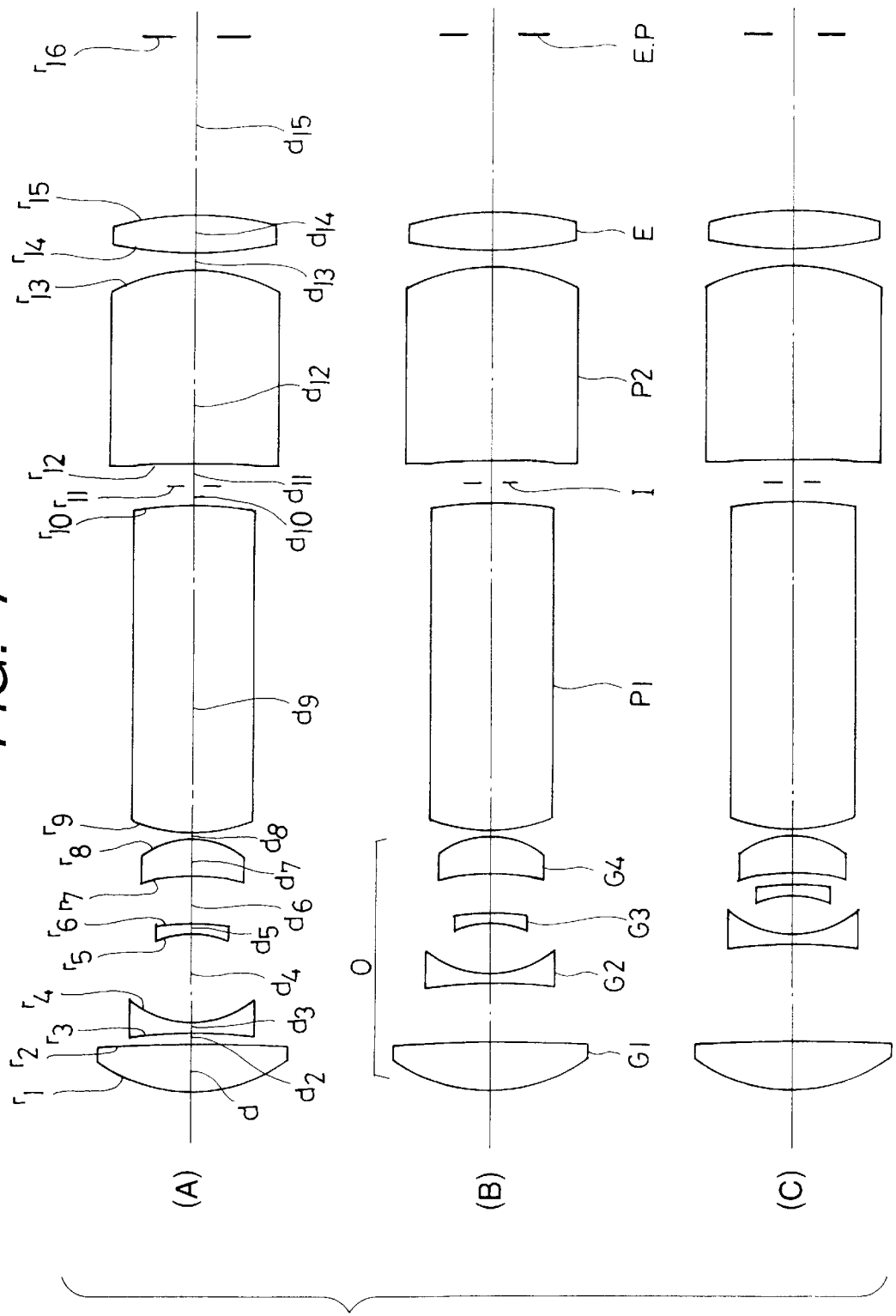
Figure 8:
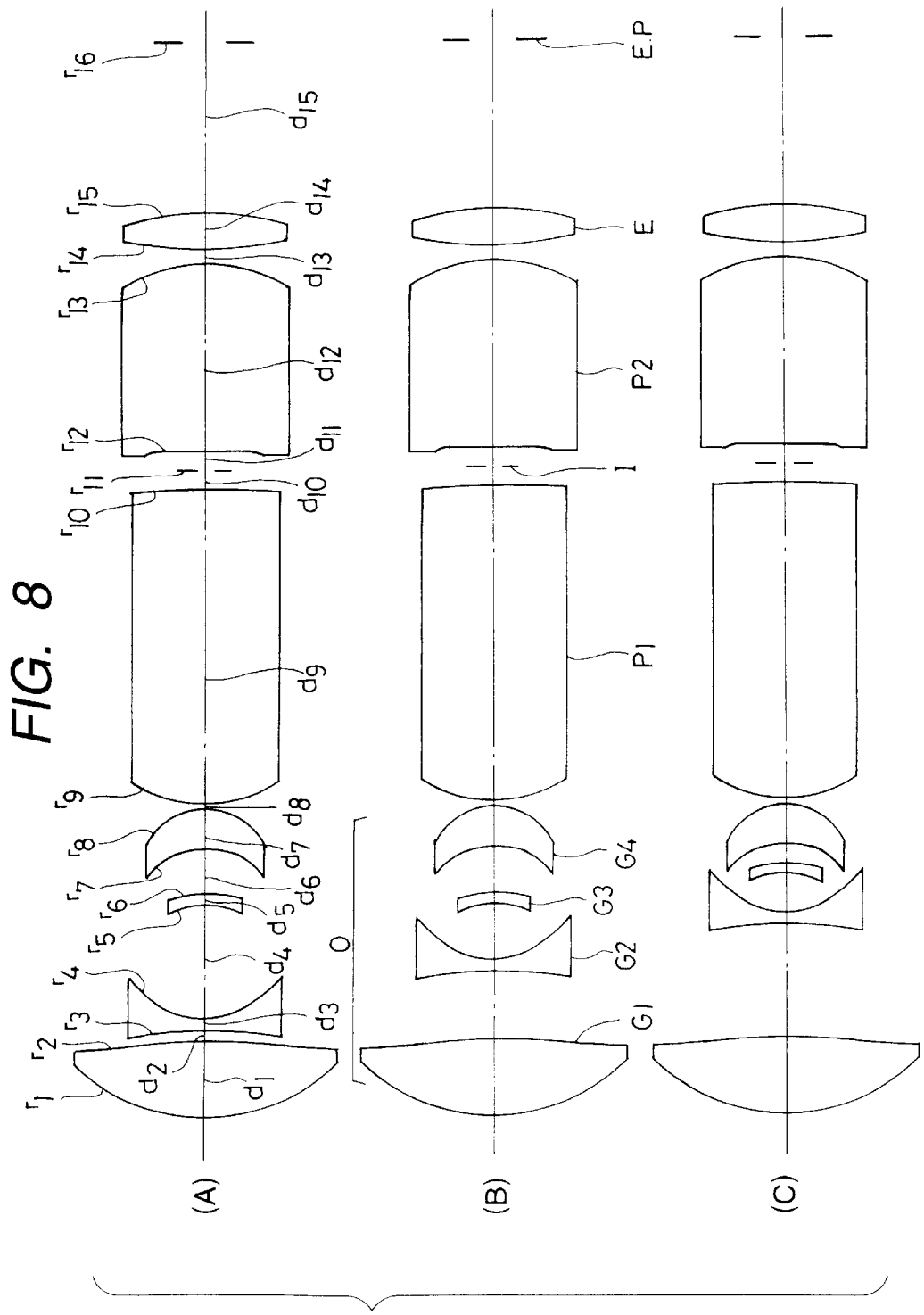

A real image type view finders according to the sixth or seventh embodiment of the present invention has a composition shown in FIG. 7 or 8, wherein an objective optical system comprises a first positive lens unit G1, a second negative lens unit G2, a third negative lens unit G3 and a fourth positive lens unit G4, changes a magnification by moving the second lens unit G2 and the third lens unit G3, and is configured so that the view finder has excellent optical performance and a large angle of emergence.

Furthermore, the sixth embodiment is an example wherein the view finder is configured to have higher optical performance by slightly lowering a vari-focal ratio.

In FIGS. 2 through 9, a reference symbol 0 represents an objective optical system, reference symbols P1 and P2 designate a first prism and a second prism respectively, a reference symbol E denotes an eyepiece optical system, and a reference symbol EP represents a location of an exit pupil. Furthermore, reference symbols (A), (B) and (C) designate conditions at a wide position, an intermediate focal length and a tele position respectively.

Each of the above described first through fifth embodiments and the eighth embodiment satisfies the conditions (1) through (9).

Furthermore, each of the sixth and seventh embodiments satisfies the conditions (1) through (8).

FIG. 11A, FIG. 11B, FIG. 11C, FIG. 12A, FIG. 12B, FIG. 12C, FIG. 13A, FIG. 13B, and FIG. 13C are curves illustrating aberration characteristics of the first embodiment. As apparent from FIG. 11A, FIG. 11B, FIG. 11C, FIG. 12A, FIG. 12B, FIG. 12C, FIG. 13A, FIG. 13B, and FIG. 13C, the view finder according to the first embodiment has favorable optical performance.

Furthermore, the view finders according to the second through eighth embodiments are also real image type view finders which have favorable optical performance like the view finder according to the first embodiment.

Shapes of aspherical surfaces used in these embodiments are expressed by the following formula:

$$X=(y^2/r)/[1+\{1-(1+k)(y/r)^2\}^{1/2}]+A_4 y^4+A_6 y^6+A_8 y^8+A_{10} y^{10}$$

wherein a direction in which rays travels along an optical axis is taken as the x axis, a direction perpendicular to the optical axis is taken as the y axis, a reference symbol r represents a radius of curvature on a reference sphere, a reference symbol k designates a conical coefficient, and reference symbols $A_4$, $A_6$, $A_8$ and $A_{10}$ denote aspherical surface coefficients.

The real image type view finder according to the present invention which is configured separately from a photographic optical system is used in cameras for 35 mm film, compact cameras such as cameras corresponding to an ASP film, digital cameras using electronic image pickup devices such as CCDs and CMOS sensors and various kinds of image pickup apparatuses such as video movies.

Description will be made of an embodiment of such an image pickup apparatus which comprises the real image type view finder according to the present invention.

Figure 14:
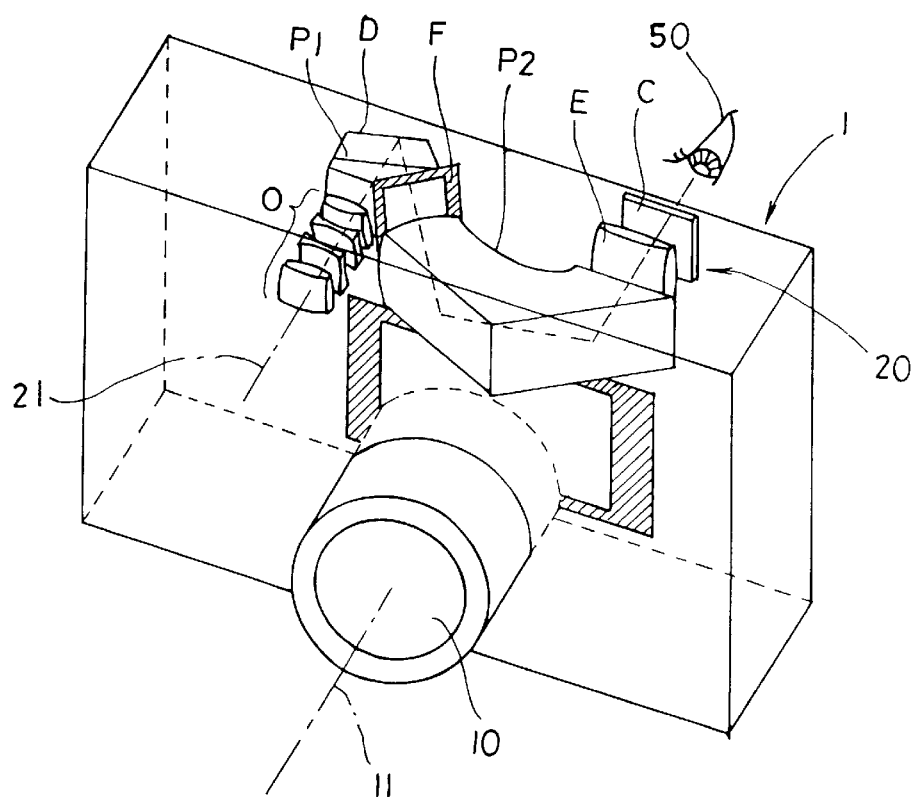
FIG. 14 is a perspective view of an electronic camera equipped with the real image type view finder according to the present invention as seen from a front side.
Figure 15:
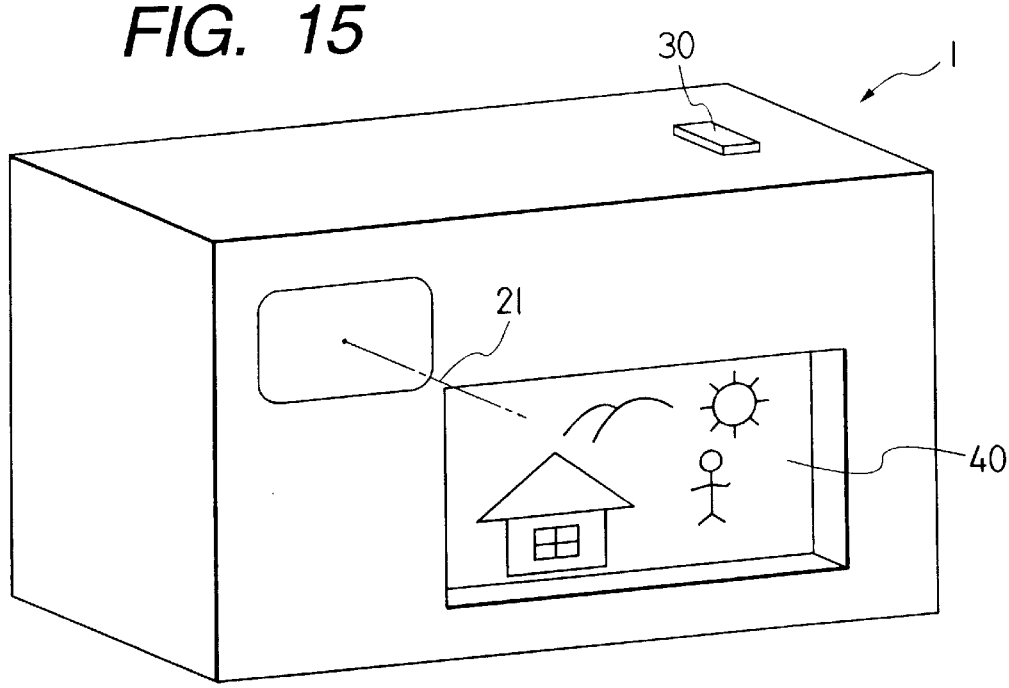
FIG. 15 is a perspective view of the electronic camera shown in FIG. 14 as seen from a rear side.
Figure 16:
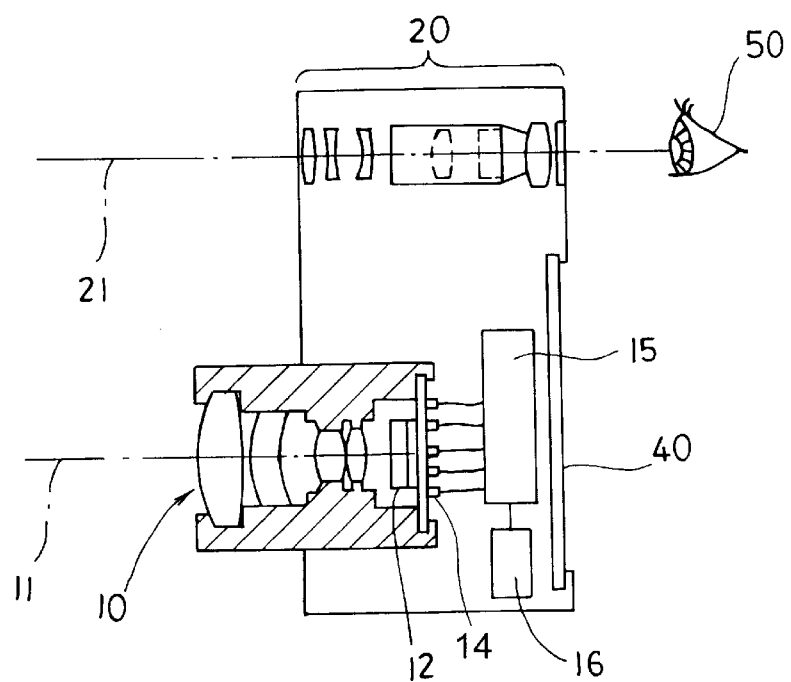
FIG. 16 is a sectional view of the electronic camera shown in FIG. 14.

FIG. 14 through FIG. 16 show an electronic camera in which the real image type view finder according to the present invention is assembled. Out of these drawings, FIG. 14 is a perspective drawing showing the electronic camera as seen from a front side, FIG. 15 is perspective view of the electronic camera as seen from a rear side and FIG. 16 is a sectional view of the electronic camera.

A reference numeral 1 represents the electronic camera, a reference numeral 10 designates a photographic optical system having a photographic optical path 11, a reference numeral 20 denotes the real image type view finder according to the present invention having a view finder optical path 21, a reference numeral 30 represents a release button and a reference numeral 40 designate a liquid crystal display means.

Furthermore, various kinds of filters 12 such as an infrared ray cut filter and a low pass filter are disposed in the photographic optical system as shown in FIG. 16, and an image pickup device chip 13 such as a CCD is disposed at a location of an image which is formed by way of these filters.

Furthermore, a reference numeral 15 represents processing means which is electrically connected to a terminal 14 and a reference numeral 16 designates a recording medium, for example, a floppy disk, a smart medium or a memory card which is electrically connected to the processing means 15. Furthermore, the liquid crystal display means 40 is connected to the processing means 15.

Disposed as the real image type view finder 20 is the real image type view finder according to the above described embodiment of the present invention which consists of an objective optical system 0, a first prism P1 having a roof surface D, a visual field frame F, a second prism P2, an eyepiece optical system E and the like. Furthermore, a reference symbol C represents a cover glass plate and a reference numeral 50 designates an observer's eyeball.

When the release button 30 is depressed on the electronic camera which is configured as described above, the electronic camera performs photographing through the photographic optical system 10 which is interlocked with the release button 30. The photographic optical system 10 forms an image on the image pickup device chip 13 by way of the various kinds of filters 12.

An image of an object received by the image pickup device chip 13 is displayed as an electronic image on the liquid crystal display monitor 40 by way of the processing means 15. Furthermore, the processing means 15 performs control for recording the image of the object picked up by the image pickup device chip 13 as electronic information in recording means 16.

When the photographic optical system 10 is a zoom lens system, the real image type view finder according to any one of the above described embodiments of the present invention is used as the view finder 20 having the view finder optical path 11. When the photographic optical system is an optical system having a single focal point, in contrast, an objective lens system having a single focal point which permits observing a photographing range is used as an objective optical system of the real image type view finder.

Figure 17:
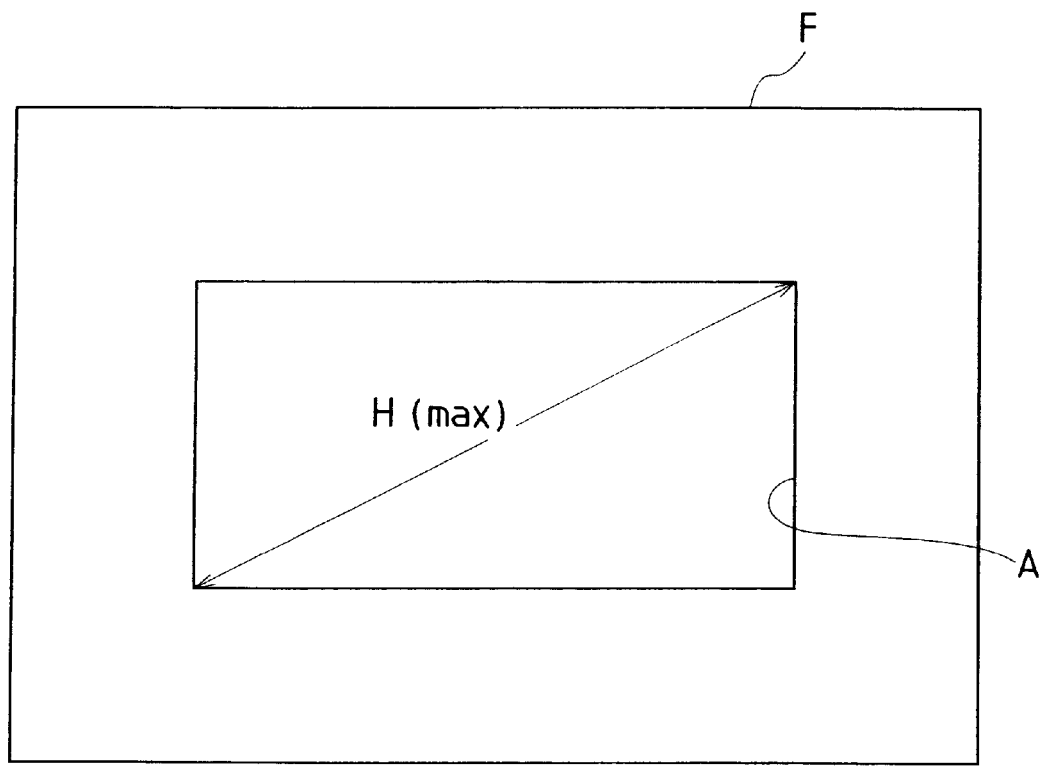
FIG. 17 is a diagram showing a configuration of a visual field frame to be used in the real image type view finder according to the present invention.

Furthermore, the visual field frame F which is disposed at a location of an intermediate image formed by the view finder between the first prism P1 and the second prism P2 is, for example, a visual field frame shown in FIG. 17 which has a rectangular aperture A having a diagonal length equal to the maximum width H (max). Furthermore, the visual field frame may consists of a liquid crystal display element (LCD) which has a modifiable size of a visual field frame.

Now, description will be made of stops to be used in the real image type view finder according to the present invention.

Figure 18:
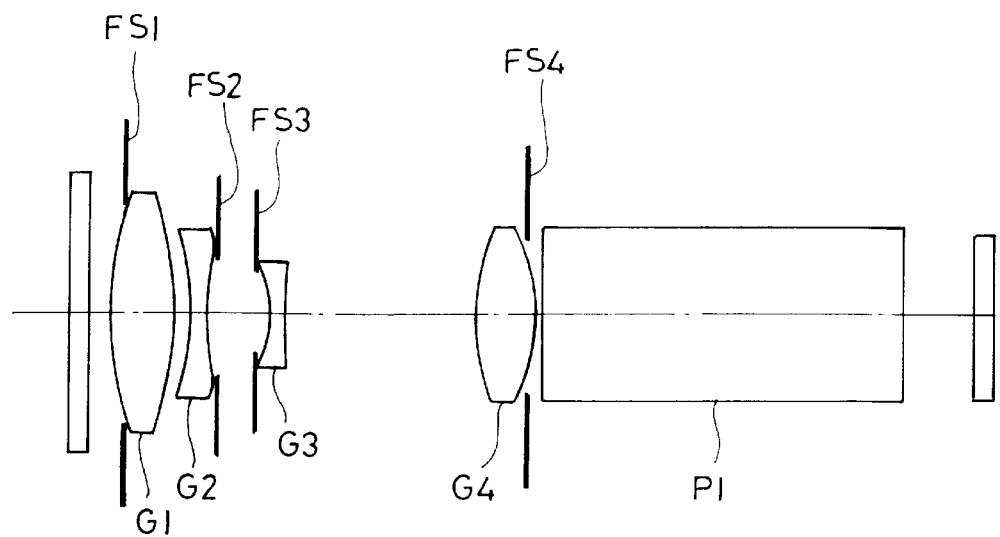
FIG. 18 is a diagram showing an example of location of a flare stop to be used in an objective optical system of the real image type view finder according to the present invention.

FIG. 18 shows examples of flare stops FS1 through FS4 which are disposed on the first lens G1 through the fourth lens unit G4 of the objective optical system in the view finder according to the first embodiment of the present invention shown in FIG. 2 for intercepting unwanted rays during a magnification change. Though locations of the flare stops are shown in the drawing, the stops are actually formed by coating a black paint over front surfaces or rear surfaces of lens elements or a similar technique.

When the flare stops are disposed as described above, each stop intercepts the unwanted rays at any location of a vari-focal region, thereby making it possible to obtain a view finder which produces flare in a small amount even when each lens unit is configured compact.

Figure 19:
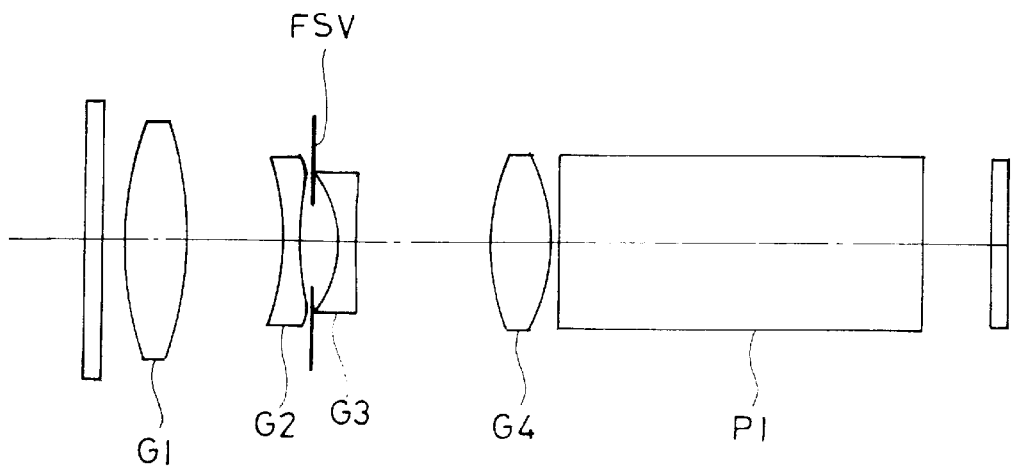
FIG. 19 is a diagram showing an example of location of a stop having a variable aperture diameter to be used in the objective optical system of the real image type view finder according to the present invention.

Like FIG. 18, FIG. 19 shows a flare stop FSV having a variable aperture which is disposed between the second lens unit and the third lens unit in the objective optical system of the view finder according to the first embodiment of the present invention.

This flare stop FSV which functions as a variable stop is capable of changing the aperture as a magnification is changed, thereby intercepting flare rays from a wide position to a tele position and making it possible to obtain a view finder which produces flare in a small amount even when the lens units are configured compact.

It is preferable to dispose such a flare stop having a variable aperture on a pupil side of the second lens unit or on an object side of the third lens unit.

Furthermore, the flare stop having the variable aperture may be disposed integrally with a lens unit or independently of a lens unit. Furthermore, it is desirable to configure the flare stop having the variable aperture so as to have an aperture at the tele position which is larger than that at the wide position.

Figure 20:
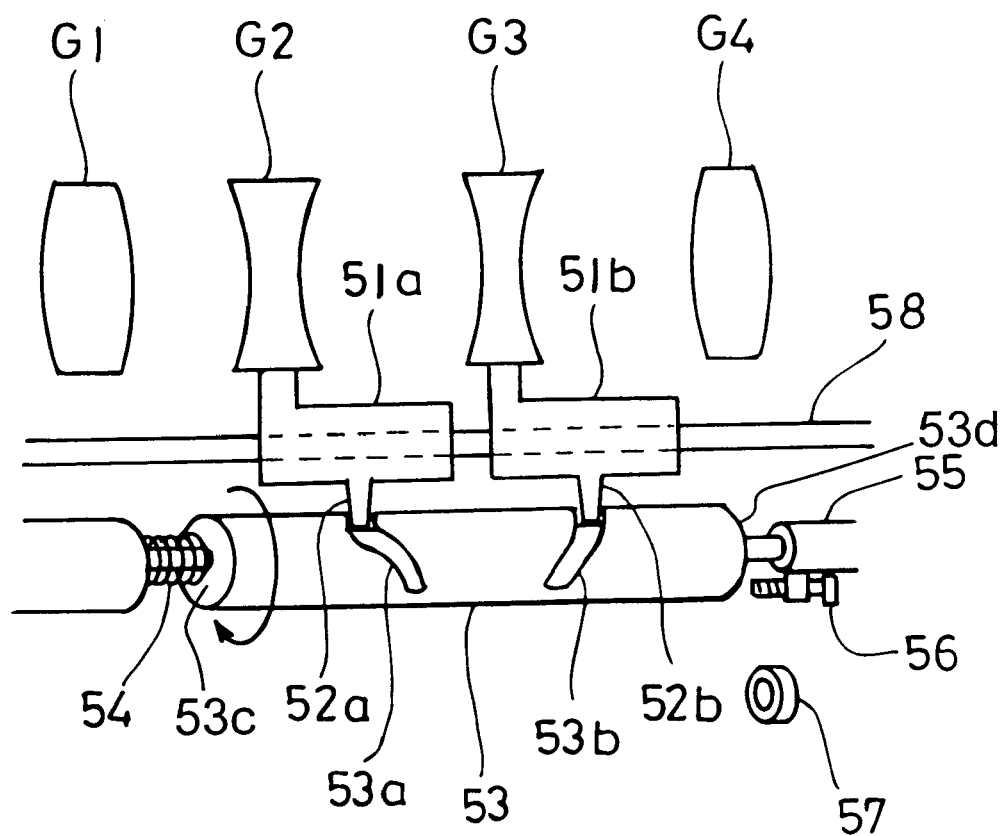
FIG. 20 is a diopter adjusting mechanism of the real image type view finder according to the present invention.

FIG. 20 shows an embodiment of the real image type view finder according to the present invention which has means for adjusting a diopter deviation at an assembling stage by changing locations of the second lens unit G2 and the third lens unit G3 which are movable for a magnification change out of lens units which compose an objective optical system.

In FIG. 20, reference symbols G1, G2, G3 and G4 represent a first lens unit, the second lens unit, the third lens unit and a fourth lens unit respectively of the objective optical system. Out of these lens units, the second lens unit G2 and the third lens unit G3 are movable lens units, and protrusions 52a and 52b are formed on holding frames 51a and 51b respectively which hold these lens units and fitted into cam grooves 53a and 53b respectively of a helicoid 53. Furthermore, a spring 54 is disposed at an end 53c of the helicoid 53 as an elastic member so that the helicoid 53 is pressed on an opposite side (rightward in the drawing) by the spring 54. Furthermore, a latch member 55 is disposed at the other end 53d of the helicoid 53 so that the helicoid 53 which is pressed by the spring 54 is positioned by the latch member 55. A screw 56 is disposed at a location of the latch member 55.

The view finer according to the embodiment which has the above described configuration moves the second lens unit G2 and the third lens unit G3 for a magnification change by turning the helicoid 53, thereby moving the holding frames 51a and 51b along the a shaft 58 with cam grooves 53a, 53b and the protrusions 52a, 52b fitted on the cam grooves 53a and 53b.

When a diopter deviation caused due to a manufacturing error or the like is to be adjusted at the assembling stage, on the other hand, the helicoid is adjusted by turning the screw 56, whereby the second lens unit G2 and the lens unit G3 are adjusted together with the helicoid in a direction along an optical axis.

In addition to the adjustment with the screws, the lens units can be adjusted with an O ring 57 which is disposed at a location of the latch member as shown in FIG. 20.

The real image type view finder according to the present invention has a vari focal ratio on the order of 4 and exhibits favorable optical performance over an entire vari-focal region from a wide position to a tele position.

What is claimed is:

1. A real image type view finder comprising:
   an objective optical system which forms an intermediate image and has positive refractive power;
   an image erecting optical system which comprises at least a prism and erects said intermediate image; and
   an eyepiece optical system which leads said intermediate image to an observer's eye,
   wherein said objective optical system comprises, in order from the object side, a first lens unit having positive refractive power, a second lens unit having negative refractive power, a third lens unit having negative refractive power and a fourth lens unit having positive refractive power, changes a magnification by moving said second lens unit and said third lens unit, and satisfies the following condition (1):

$$0.97 < Lr/S < 1.2 \tag{1}$$

wherein a reference symbol Lr represents an optical path length as measured from a location of the intermediate image to an object side surface of the eyepiece optical system and a reference symbol S designates a distance as measured from a most object side curved surface of the objective optical system to a most image side curved surface of the objective optical system.

2. A manufacturing method of real image type view finder comprising a step of: performing diopter adjustments for the view finder for a first specification according to claim 1 and the view finder for a second specification which are two different specifications by changing locations of the first lens unit, the second lens unit and the third lens unit collectively of said objective optical system.

3. A manufacturing method of real image type view finder according to claim 2, wherein the view finder is manufactured so that the view finder for the first specification comprises a liquid crystal display element which is disposed in the vicinity of the intermediate image and the view finder for said second specification comprises an airspace in the vicinity of the intermediate image, and the first lens unit, the second lens unit and the third lens unit of said objective optical system for the first specification are located on an exit pupil side of the lens units for the second specification.

4. A manufacturing method of real image type view finder according to claim 1 comprising a step of; performing diopter adjustment for the real image type view finder at an assembling stage by changing a location of said second lens unit independently or locations of the second lens unit and the third lens unit collectively of said objective optical system.

5. A real image type view finder comprising: an objective optical system which forms an intermediate image and has positive refractive power; an image erecting optical system which comprises at least a prism and erects said intermediate image; and an eyepiece optical which leads said intermediate image to an observer's eye, wherein said objective optical system comprises, in order from the object side, a first lens unit having positive refractive power, a second lens unit having negative refractive power, a third lens unit having negative refractive power and a fourth lens unit having positive refractive power, changes a magnification by moving said second lens unit and said third lens unit in an identical direction along an optical axis and satisfies the following condition (2):

$$-0.4 < f_4/(f_3 \times z) < -0.185 \tag{2}$$

wherein reference symbols $f_3$ and $f_4$ represent focal lengths of the third lens unit and the fourth lens unit respectively, and a reference symbol z designates a vari-focal ratio.

6. The real image type view finder according to claim 5 satisfying the following condition (3):

$$0.4 < |f_2|/fE < 0.55 \tag{3}$$

wherein a reference symbol $f_2$ represents a focal length of the second lens unit and a reference symbol fE designates a focal length of the eyepiece optical system.

7. The real image type view finder according to claim 5, wherein each lens unit disposed in said objective optical system consists of a lens element and satisfies the following condition (4) and (5):

$$20 < v_d(2) < 40 \tag{4}$$

$$45 < v_d(3) < 65 \tag{5}$$

wherein reference symbols $v_d$ (2) and) $v_d$ (3) represent Abbe's number of the second lens unit and the third lens unit respectively.

8. The real image type view finder according to claim 1 or 5, wherein the first lens unit and the fourth lens unit of said objective optical system are kept stationary during a magnification change.

9. A real image type view finder comprising: an objective optical system which forms an intermediate image and has positive refractive power; an image erecting optical system which comprises at least a prism and erects said intermediate image; and an eyepiece optical system which leads said intermediate image to an observer's eye, wherein said objective optical system comprises, in order from the object side, a first lens unit having positive refractive power, a second lens unit having negative refractive power, a third lens unit having negative refractive power and a fourth lens unit having positive refractive power, changes a magnification by moving said second lens unit and said third lens unit, and satisfies the following condition (6):

$$1.1 < (f_1 \times f_2)/(f_3 \times f_4) < 1.6 \tag{6}$$

wherein $f_1$, $f_2$, $f_3$ and $f_4$ represent focal lengths of the first lens unit, the second lens unit, the third lens unit and the fourth lens unit respectively.

10. The real image type view finder according to claim 1, 5 or 9, wherein said image erecting optical system comprises a roof reflecting surface and two reflecting surfaces, rays incident on an edge line of said roof reflecting surface are reflected at acute angles and said two reflecting surfaces reflect rays at obtuse angles.

11. The real image type view finder according to claim 1, 5 or 9, wherein said image erecting optical system comprises a first prism which has a spherical or aspherical surface of incidence.

12. The real image type view finder according to claim 1, 5 or 9, wherein said image erecting optical system comprises a first prism which has a spherical or aspherical surface of incidence.

13. The real image type view finder according to claim 12, wherein said first prism is a fifth lens unit of said objective optical system.

14. The real image type view finder according to claim 1, 5 or 9, wherein diopter adjustment for a first specification and a second specification which are two different specifications is performed by changing locations of said first lens unit, second lens unit and third lens unit collectively.

15. The real image type view finder according to claim 14, wherein said first specification comprises a liquid crystal display element, and locations of the first, second and third lens units for said second specification are on an exit pupil side of locations of the first, second and third lens units for said first specification.

16. The real image type view finder according to claim 1, 5 or 9, wherein the view finder is configured to permits performing diopter adjustment at an assembling stage by changing a location of the second lens unit independently or locations of the second lens unit and the third lens unit integrally of said objective optical system.

17. The real image type view finder according to claim 1, 5 or 9, wherein flare stops which intercept unwanted rays are disposed on all the lens units of the objective optical system which is disposed on the object side of said image erecting optical system.

18. The real image type view finder according to claim 1, 5 or 9, wherein an aperture stop which has variable aperture diameter is disposed in said objective optical system.

19. The real image type view finder according to claim 1, 5 or 9, wherein each lens unit of said objective optical system consists only of a lens element.

20. The real image type view finder according to claim 1, 5 or 9, wherein the objective optical system has a van-focal ration of 3.5 or higher.

21. A real image type view finder comprising: an objective optical system which forms an intermediate image and has positive refractive power; an image erecting optical system which erects said intermediate image; and an eyepiece optical system which leads said intermediate image to an observer's eye, wherein said objective optical system comprises, in order from the object side, a first lens unit having positive refractive power, a second lens unit having negative refractive power, a third lens unit having negative refractive power and a fourth lens unit having positive refractive power, changes a magnification by moving said second lens unit and said third lens unit, and satisfies the following condition (9):

$$0.8 < (L3-L2) \times z/L2 < 5.5 \tag{9}$$

wherein reference symbols L2 and L3 represent moving distances of the second lens unit and the third lens unit from a wide position to a tele position, and a reference symbol z designates a vari-focal ratio.

22. A real image type view finder comprising: a photographic optical system; an objective optical system which is disposed separately from the photographic optical system and forms an intermediate image; a visual field frame which is disposed in the vicinity of said intermediate image; an image erecting optical system which erects said intermediate image; and an eyepiece optical system, wherein said objective optical system comprises, in order from the object side, a first lens unit having positive refractive power, a second lens unit having negative refractive power, a third lens unit having negative refractive power and a fourth lens unit having positive refractive power, and satisfies the following condition (7):

$$0.52 < H \text{ (max)}/fe < 1 \tag{7}$$

wherein a reference symbol H (max) represents a maximum width of the visual field frame and a reference symbol fe designates a focal length of an optical system as a whole which is on an emergence side of the intermediate image.

23. The real image type view finder according to claim 22, wherein said objective optical system changes a focal length by moving at least two lens units along different loci.

24. The real image type view finder according to claim 22 satisfying the following condition (8):

$$13 \text{ mm} < fE < 16.5 \text{ mm} \tag{8}$$

wherein a reference symbol fE represents a focal length of the eyepiece optical system.

25. The real image type view finder according to claim 24 satisfying, in place of the condition (8), the following condition (8-1):

$$13.5\ mm < fE < 16.5\ mm \qquad (8\text{-}1).$$

26. A real image type view finder comprising:
an objective optical system which forms an intermediate image and has positive refractive power;
an image erecting optical system which erects said intermediate image; and
an eyepiece optical system which leads said intermediate image to an observer's eye, wherein said objective optical system comprises, in order from the object side, a first lens unit having positive refractive power, a second lens unit having negative refractive power, a third lens unit having negative refractive power and a fourth lens unit having positive refractive power, changes a magnification by moving said second lens unit and said third lens unit, and satisfies the following condition (9):

$$0.8 < (L3-L2) \times z/L2 < 5.5 \qquad (9)$$

wherein reference symbols L2 and L3 represent moving distances of the second lens unit and the third lens unit from a wide position to a tele position, and a reference symbol z designates a van-focal ratio, and
wherein the view finder is configured to permit performing diopter adjustment at an assembling stage by changing a location of the second lens unit independently or locations of the second lens unit and the third lens unit integrally of said objective optical system.

27. A real image type view finder comprising:
an objective optical system which forms an intermediate image and has a positive refractive power;
an image erecting optical system which comprises at least a prism and erects said intermediate image;
an eyepiece optical system which leads said intermediate image to an observer's eye; and
an optical member which is disposed in the vicinity of said intermediate image separately from said prism,
wherein said optical member is exchangeable independently with another optical member for an identical specification, and
wherein an aperture stop which has variable aperture diameter is disposed in said objective optical system.

28. A real image type view finder comprising:
an objective optical system which forms an intermediate image and has positive refractive power;
an image erecting optical system which erects said intermediate image; and
an eyepiece optical system which leads said intermediate image to an observer's eye,
wherein said objective optical system comprises, in order from the object side, a first lens unit having positive refractive power, a second lens unit having negative refractive power, a third lens unit having negative refractive power and a fourth lens unit having positive refractive power, changes a magnification by moving said second lens unit and said third lens unit, and satisfies the following condition (9):

$$0.8 < (L3-L2) \times z/L2 < 5.5 \qquad (9)$$

wherein reference symbols L2 and L3 represent moving distances of the second lens unit and the third lens unit from a wide position to a tele position, and a reference symbol z designates a van-focal ration, and
wherein an aperture stop which has variable aperture diameter is disposed in said objective optical system.

29. A real image type view finder comprising:
an objective optical system which forms an intermediate image and has positive refractive power;
an image erecting optical system which erects said intermediate image and an eyepiece optical system which leads said intermediate image to an observer's eye,
wherein said objective optical system comprises, in order from the object side, a first lens unit having positive refractive power, a second lens unit having negative refractive power and a fourth lens unit having positive refractive power, changes a magnification by moving said second lens unit and said third lens unit, and satisfies the following condition (9):

$$0.8 < (L3-L2) \times z/L2 < 5.5 \qquad (9)$$

wherein reference symbols L2 and L3 represent moving distances of the second lens unit and the third lens unit from a wide position to a tele position, and a reference symbol z designates a van-focal ratio, and wherein each lens unit of said objective optical system consists only of a lens element.

30. A real image type view finder comprising:
an objective optical system which forms an intermediate image and has positive refractive power;
an image erecting optical system which comprises at least a prism and erects said intermediate image;
an eyepiece optical system which leads said intermediate image to an observer's eye; and
an optical member which is disposed in the vicinity of said intermediate image separately from said prism,
wherein said optical member is exchangeable independently with another optical member for an identical specification, and wherein the objective optical system has a van-focal ratio of 3.5 or higher.

31. A real image type view finder comprising:
an objective optical system which forms an intermediate image and has positive refractive power;
an image erecting optical system which erects said intermediate image; and an eyepiece optical system which leads said intermediate image to an observer's eye,
wherein said objective optical system comprises, in order from the object side, a first lens unit having positive refractive power, a second lens unit having negative refractive power, a third lens unit having negative refractive power and a fourth lens unit having positive refractive power, changes a magnification by moving said second lens unit and said third lens unit, and satisfies the following condition (9):

$$0.8 < (L3-L2) \times z/L2 < 5.5 \qquad (9)$$

wherein reference symbols L2 and L3 represent moving distances of the second lens unit and the third lens unit from a wide position to a tele position, and a reference symbol z designates a van-focal ratio, and wherein the objective optical system has a van-focal ratio of 3.5 or higher.

32. A real image type view finder comprising:

an objective optical system which forms an intermediate image and has positive refractive power;

an image erecting optical system which comprises at least a prism and erects said intermediate image;

an eyepiece optical system which leads said intermediate image to an observer's eye; and an optical member which is disposed in the vicinity of said intermediate image separately from said prism, and wherein the objective optical system has a van-focal ratio of 3.5 or higher.

33. An image pickup apparatus including a real image type view finder according to claim 1, 5, 9, 22, 26, 27, 28, 29, 30, 31 or 32 comprising:

a photographic optical system which is disposed separately from said view finder.

* * * * *